US010879960B2

(12) United States Patent
Suzuki et al.

(10) Patent No.: US 10,879,960 B2
(45) Date of Patent: Dec. 29, 2020

(54) COMMUNICATION DEVICE

(71) Applicant: Brother Kogyo Kabushiki Kaisha, Nagoya (JP)

(72) Inventors: Takanobu Suzuki, Nagoya (JP); Hirotaka Asakura, Nagoya (JP); Munehisa Matsuda, Nagoya (JP); Satoshi Tanaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/274,472

(22) Filed: Feb. 13, 2019

(65) Prior Publication Data
US 2019/0181914 A1 Jun. 13, 2019

Related U.S. Application Data

(60) Continuation of application No. 15/584,056, filed on May 2, 2017, now Pat. No. 10,333,587, which is a
(Continued)

(30) Foreign Application Priority Data

Mar. 30, 2012 (JP) .................. 2012-082819

(51) Int. Cl.
*H04B 5/00* (2006.01)
*H04W 76/19* (2018.01)
(Continued)

(52) U.S. Cl.
CPC ............. *H04B 5/00* (2013.01); *H04B 5/0031* (2013.01); *H04B 5/0056* (2013.01);
(Continued)

(58) Field of Classification Search
CPC combination set(s) only.
See application file for complete search history.

(56) References Cited

U.S. PATENT DOCUMENTS 7,209,706 B2  4/2007  Fujii et al.
7,346,061 B2  3/2008  Takayama et al.
(Continued)

FOREIGN PATENT DOCUMENTS

CN   101253469 A   8/2008
CN   101790183 A   7/2010
(Continued)

OTHER PUBLICATIONS

Jul. 2, 2013—(US) Co-pending U.S. Appl. No. 13/933,419.
(Continued)

*Primary Examiner* — Junpeng Chen
(74) *Attorney, Agent, or Firm* — Banner & Witcoff, Ltd.

(57) ABSTRACT

An MFP establishes a first communication link L1 by receiving an activation command and sending an OK command. The MFP receives first target data from a portable device by using the first communication link. The MFP generates second target data by processing the first target data. After receiving the first target data, the MFP disconnects the first communication link. The MFP establishes a second communication link by receiving the activation command and sending the OK command. The MFP sends the second target data to the portable device by using the second communication link.

3 Claims, 12 Drawing Sheets

Related U.S. Application Data division of application No. 13/834,434, filed on Mar. 15, 2013, now Pat. No. 9,787,363.

(51) Int. Cl.
*H04W 4/80* (2018.01)
*H04W 84/18* (2009.01)
*H04W 76/30* (2018.01)
*H04W 76/10* (2018.01)
*H04N 1/00* (2006.01)
*H04W 76/14* (2018.01)
*H04W 76/15* (2018.01)

(52) U.S. Cl.
CPC .......... *H04N 1/00342* (2013.01); *H04W 4/80* (2018.02); *H04W 76/10* (2018.02); *H04W 76/19* (2018.02); *H04W 76/30* (2018.02); *H04W 84/18* (2013.01); *H04N 2201/006* (2013.01); *H04N 2201/0094* (2013.01); *H04W 76/14* (2018.02); *H04W 76/15* (2018.02)

(56) References Cited

U.S. PATENT DOCUMENTS

| | | | |
|---|---|---|---|
| 8,189,225 | B1 | 5/2012 | Lo et al. |
| 8,380,183 | B2 | 2/2013 | Misumi et al. |
| 9,274,738 | B2 | 3/2016 | Naruse |
| 2003/0007606 | A1 | 1/2003 | Suder et al. |
| 2004/0116074 | A1 | 6/2004 | Fujii et al. |
| 2004/0128555 | A1 | 7/2004 | Saitoh et al. |
| 2004/0192264 | A1 | 9/2004 | Liu et al. |
| 2004/0248514 | A1 | 12/2004 | Idani et al. |
| 2005/0077356 | A1 | 4/2005 | Takayama et al. |
| 2005/0088709 | A1 | 4/2005 | Kizaki et al. |
| 2005/0268104 | A1 | 12/2005 | Sugishita et al. |
| 2006/0101280 | A1 | 5/2006 | Sakai |
| 2006/0126118 | A1 | 6/2006 | Nagata |
| 2006/0245402 | A1 | 11/2006 | Fujii et al. |
| 2007/0051803 | A1 | 3/2007 | Tada et al. |
| 2007/0156726 | A1 | 7/2007 | Levy |
| 2007/0190937 | A1 | 8/2007 | Takayama |
| 2007/0190939 | A1 | 8/2007 | Abel |
| 2007/0230332 | A1 | 10/2007 | Fukasawa |
| 2008/0046570 | A1 | 2/2008 | Abel |
| 2008/0052710 | A1 | 2/2008 | Iwai et al. |
| 2008/0080392 | A1 | 4/2008 | Walsh et al. |
| 2008/0084578 | A1 | 4/2008 | Walker et al. |
| 2008/0113655 | A1 | 5/2008 | Angelhag |
| 2008/0117847 | A1 | 5/2008 | Hamada |
| 2008/0218810 | A1 | 9/2008 | Itoh |
| 2008/0222711 | A1 | 9/2008 | Michaelis |
| 2008/0231900 | A1 | 9/2008 | Abe |
| 2008/0232405 | A1 | 9/2008 | Gallo |
| 2008/0252415 | A1 | 10/2008 | Larson et al. |
| 2008/0288958 | A1 | 11/2008 | Ryoo et al. |
| 2008/0299907 | A1 | 12/2008 | Takayama |
| 2009/0009299 | A1 | 1/2009 | Ikeda et al. |
| 2009/0021764 | A1 | 1/2009 | Kano |
| 2009/0023476 | A1 | 1/2009 | Saarisalo et al. |
| 2009/0024768 | A1 | 1/2009 | Maruyama et al. |
| 2009/0033972 | A1 | 2/2009 | Kato |
| 2009/0036056 | A1 | 2/2009 | Oshima et al. |
| 2009/0052348 | A1 | 2/2009 | Kato et al. |
| 2009/0066998 | A1* | 3/2009 | Kato ................... G01C 21/26 358/1.15 |
| 2009/0073482 | A1 | 3/2009 | Tsuchiya |
| 2009/0103124 | A1 | 4/2009 | Kimura et al. |
| 2009/0147803 | A1 | 6/2009 | Takayama |
| 2009/0192912 | A1 | 7/2009 | Griffin et al. |
| 2009/0193500 | A1 | 7/2009 | Griffin et al. |
| 2009/0247077 | A1 | 10/2009 | Sklovsky et al. |
| 2009/0271519 | A1 | 10/2009 | Helvick |
| 2009/0298426 | A1 | 12/2009 | Helvick |
| 2010/0050189 | A1 | 2/2010 | Sng |
| 2010/0058359 | A1 | 3/2010 | Ferlitsch |
| 2010/0069008 | A1 | 3/2010 | Oshima et al. |
| 2010/0077031 | A1 | 3/2010 | Yoneda et al. |
| 2010/0078471 | A1 | 4/2010 | Lin et al. |
| 2010/0078472 | A1 | 4/2010 | Lin et al. |
| 2010/0081385 | A1 | 4/2010 | Lin et al. |
| 2010/0082485 | A1 | 4/2010 | Lin et al. |
| 2010/0130127 | A1 | 5/2010 | Takayama |
| 2010/0151790 | A1 | 6/2010 | Hoeksel et al. |
| 2010/0188695 | A1 | 7/2010 | Okigami |
| 2010/0207735 | A1 | 8/2010 | Kim |
| 2010/0207742 | A1 | 8/2010 | Buhot et al. |
| 2010/0221999 | A1 | 9/2010 | Braun et al. |
| 2010/0241857 | A1 | 9/2010 | Okude et al. |
| 2010/0311330 | A1* | 12/2010 | Aibara ............... H04W 36/0055 455/41.2 |
| 2010/0318712 | A1 | 12/2010 | Boldyrev et al. |
| 2010/0330910 | A1* | 12/2010 | Yan ..................... H04B 5/0031 455/41.2 |
| 2011/0002005 | A1 | 1/2011 | Ashmore |
| 2011/0026068 | A1 | 2/2011 | Yoshida |
| 2011/0028091 | A1 | 2/2011 | Higgins et al. |
| 2011/0065385 | A1 | 3/2011 | Geslin et al. |
| 2011/0075186 | A1 | 3/2011 | Azuma |
| 2011/0090830 | A1 | 4/2011 | Churei |
| 2011/0116125 | A1 | 5/2011 | Park |
| 2011/0177780 | A1 | 7/2011 | Sato et al. |
| 2011/0210618 | A1 | 9/2011 | Takasu |
| 2011/0226853 | A1 | 9/2011 | Soh et al. |
| 2011/0228311 | A1 | 9/2011 | Oguma et al. |
| 2011/0234013 | A1 | 9/2011 | Hatakeyama |
| 2011/0235085 | A1 | 9/2011 | Jazayeri et al. |
| 2011/0244849 | A1 | 10/2011 | Misumi et al. |
| 2011/0258322 | A1 | 10/2011 | Luzzatti et al. |
| 2011/0267636 | A1 | 11/2011 | Kamasuka |
| 2011/0275316 | A1 | 11/2011 | Suumaki et al. |
| 2011/0292445 | A1 | 12/2011 | Kato |
| 2012/0034868 | A1 | 2/2012 | Fine et al. |
| 2012/0069772 | A1 | 3/2012 | Byrne et al. |
| 2012/0099566 | A1 | 4/2012 | Laine et al. |
| 2012/0100803 | A1 | 4/2012 | Suumaki et al. |
| 2012/0101944 | A1 | 4/2012 | Lin et al. |
| 2012/0124365 | A1 | 5/2012 | Black et al. |
| 2012/0135681 | A1 | 5/2012 | Adams et al. |
| 2012/0166338 | A1 | 6/2012 | Agnelli et al. |
| 2012/0171952 | A1 | 7/2012 | Ohira et al. |
| 2012/0173318 | A1 | 7/2012 | Lee et al. |
| 2012/0194864 | A1 | 8/2012 | Oshima et al. |
| 2012/0208461 | A1 | 8/2012 | Choi et al. |
| 2012/0212325 | A1 | 8/2012 | Kanemoto |
| 2012/0252405 | A1 | 10/2012 | Lortz et al. |
| 2012/0297048 | A1 | 11/2012 | Hsu |
| 2012/0300245 | A1 | 11/2012 | Chatterjee et al. |
| 2012/0329390 | A1 | 12/2012 | Kim |
| 2012/0330784 | A1 | 12/2012 | Nahidipour |
| 2013/0009752 | A1 | 1/2013 | Finkenzeller et al. |
| 2013/0040565 | A1 | 2/2013 | Suzuki |
| 2013/0077124 | A1 | 3/2013 | Vojak |
| 2013/0080276 | A1 | 3/2013 | Granbery |
| 2013/0083358 | A1 | 4/2013 | Suzuki |
| 2013/0165042 | A1 | 6/2013 | Gillespie et al. |
| 2013/0166969 | A1 | 6/2013 | Zhang |
| 2013/0196595 | A1 | 8/2013 | Byrne et al. |
| 2013/0203347 | A1 | 8/2013 | Moosavi |
| 2013/0204726 | A1 | 8/2013 | Cruttenden et al. |
| 2013/0215467 | A1 | 8/2013 | Fein et al. |
| 2013/0229683 | A1 | 9/2013 | Nakayama |
| 2013/0229684 | A1 | 9/2013 | Yasuzaki |
| 2013/0229690 | A1 | 9/2013 | Sumita et al. |
| 2013/0244578 | A1 | 9/2013 | Bacioccola |
| 2013/0258390 | A1 | 10/2013 | Suzuki et al. |
| 2013/0260683 | A1 | 10/2013 | Suzuki et al. |
| 2013/0260684 | A1 | 10/2013 | Suzuki et al. |
| 2013/0311313 | A1 | 11/2013 | Laracey |
| 2014/0002850 | A1 | 1/2014 | Kang |
| 2014/0004793 | A1 | 1/2014 | Bandyopadhyay et al. |
| 2014/0038517 | A1 | 2/2014 | Asakura |
| 2014/0038518 | A1 | 2/2014 | Asakura |
| 2014/0038519 | A1 | 2/2014 | Asakura |

(56) References Cited

U.S. PATENT DOCUMENTS

| | | |
|---|---|---|
| 2014/0047038 A1 | 2/2014 | Piratla et al. |
| 2014/0063537 A1 | 3/2014 | Nishikawa et al. |
| 2014/0068719 A1 | 3/2014 | Kiukkonen et al. |
| 2014/0085654 A1 | 3/2014 | Miyazaki |
| 2014/0104635 A1 | 4/2014 | Nishikawa |
| 2014/0114765 A1 | 4/2014 | Lee |
| 2014/0219453 A1 | 8/2014 | Neafsey et al. |
| 2014/0252083 A1 | 9/2014 | Lee et al. |
| 2014/0256251 A1 | 9/2014 | Caceres et al. |
| 2014/0293980 A1 | 10/2014 | Shibata |
| 2014/0297892 A1 | 10/2014 | Kaigawa |
| 2014/0304596 A1 | 10/2014 | Chandran et al. |
| 2014/0368859 A1 | 12/2014 | Gutnik et al. |
| 2014/0378052 A1 | 12/2014 | Hamada |
| 2014/0378060 A1 | 12/2014 | Akama |
| 2015/0067800 A1 | 3/2015 | Hosoda |
| 2015/0093992 A1 | 4/2015 | Tanaka |
| 2015/0126115 A1 | 5/2015 | Yun et al. |
| 2015/0189595 A1 | 7/2015 | Shibao |
| 2015/0205550 A1 | 7/2015 | Lee et al. |
| 2015/0208245 A1 | 7/2015 | Robinton et al. |
| 2015/0213436 A1 | 7/2015 | Griffin et al. |
| 2015/0220290 A1 | 8/2015 | Park et al. |
| 2015/0270912 A1 | 9/2015 | Dhayni et al. |
| 2015/0317116 A1 | 11/2015 | Suzuki et al. |
| 2015/0327172 A1 | 11/2015 | Kusakabe |
| 2015/0350905 A1 | 12/2015 | Suzuki |
| 2015/0382135 A1 | 12/2015 | Kawahara et al. |

FOREIGN PATENT DOCUMENTS

| | | |
|---|---|---|
| CN | 103369637 A | 10/2013 |
| EP | 2296292 A1 | 3/2011 |
| EP | 2645265 A2 | 10/2013 |
| JP | H11-154061 A | 6/1999 |
| JP | 2000-228666 A | 8/2000 |
| JP | 2004-200840 A | 7/2004 |
| JP | 200770047 A | 3/2007 |
| JP | 2007079636 A | 3/2007 |
| JP | 2007079639 A | 3/2007 |
| JP | 2007-166538 A | 6/2007 |
| JP | 2007221682 A | 8/2007 |
| JP | 2009-037566 A | 2/2009 |
| JP | 2009-135865 A | 6/2009 |
| JP | 2010501135 A | 1/2010 |
| JP | 2011-044092 A | 3/2011 |
| JP | 201187249 A | 4/2011 |
| JP | 2011073272 A | 4/2011 |
| JP | 2011-146991 A | 7/2011 |
| JP | 2011-188312 A | 9/2011 |
| JP | 2011-217063 A | 10/2011 |
| JP | 201260609 A | 3/2012 |
| JP | 2013505670 A | 2/2013 |
| JP | 2013-132491 A | 7/2013 |
| JP | 2013-187565 A | 9/2013 |
| JP | 2013-214139 A | 10/2013 |
| JP | 2013-214804 A | 10/2013 |
| JP | 2014071488 A | 4/2014 |
| JP | 2015-008382 A | 1/2015 |
| WO | 03061205 A1 | 7/2003 |
| WO | 2005/017738 A1 | 2/2005 |
| WO | 2008021032 A2 | 2/2008 |
| WO | 2011037725 A2 | 3/2011 |

OTHER PUBLICATIONS

Aug. 5, 2014—U.S. Non-Final Office Action—U.S. Appl. No. 13/933,419.
Jan. 17, 2014—(EP) Extended Search Report—App 13179157.6.
Aug. 31, 2011—"Simple NDEF Exchange Protocol"—Technical Specification, SNEP 1.0, pp. 1-20.
Feb. 13, 2015—U.S. Non-Final Office Action—U.S. Appl. No. 13/957,479.
Jan. 17 2014—(EP) Extended Search Report—App 13179154.3.
Feb. 12, 2015—U.S. Non-Final Office Action—U.S. Appl. No. 13/957,490.
Nov. 17, 2010—"NFC Digital Protocol," NFCForum-TS-DigitalProtocol-1.0.
Jul. 13, 2015—U.S. Final Office Action—U.S. Appl. No. 13/957,479.
Jul. 16, 2015—U.S. Final Office Action—U.S. Appl. No. 13/957,490.
Mar. 15, 2013—(US) Co-Pending U.S. Appl. No. 13/834,434.
Sep. 23, 2013—(EP) Search Report—App 13174778.4.
Nov. 26, 2014—U.S. Notice of Allowance—U.S. Appl. No. 13/933,419.
Aug. 31, 2015—U.S. Non-Final Office Action—U.S. Appl. No. 14/663,923.
Dec. 17, 2015—U.S. Notice of Allowance—U.S. Appl. No. 13/957,479.
Oct. 14, 2015—(EP) Office Action—App 13179157.6.
Jul. 4, 2012—Jara, Antonio et al., "Interaction of patients with breathing problems through NFC in Ambient Assisted Living environements," 2012 Sixth International Conference on Innovative Mobile and Internet Services in Ubiquitous Computing, pp. 892-897, XP032234827, DOI: 10.1109/IMIS.2012.150 ISBN: 978-1-4673-1328-5.
May 14, 2012—Monteiro, David et al., "A Secure NFC Application for Credit Transfer Among Mobile Phones," 2012 International Conference on Computer Information and Telecommunication Systems (CITS), IEEE, pp. 1-5, XP032188431, DOI: 10.1109/CITS.2012.6220369 ISBN: 978-1-4673-1549-4.
Anonymous,:"Near Field Communication White Paper", Feb. 12, 2004, URL:http://www.ecma-international.org/activities/Communications/2004tg19-001.pdf [retrieved on Mar. 6, 2006].
Wi-Fi Peer-to-Peer (P2P) Technical Specification Version Jan. 1, 2010, pp. 1-159.
Jan. 17, 2014—(EP) Search Report—Application No. 13179289.7.
Smart Cards; UICC-CLF interface; Host Controller Interface P2P LNC Protocol, Vo. 1.0, Jan. 11, 2008, pp. 1-33.
May 9, 2014—U.S. Non-Final Office Action—U.S. Appl. No. 13/834,423.
May 9, 2014—U.S. Non-Final Office Action—U.S. Appl. No. 13/833,236.
Jul. 23, 2013—(EP) Extended Search Report—Application No. 13161732.6.
Sep. 4, 2014—U.S. Final Office Action—U.S. Appl. No. 13/834,423.
Oct. 27, 2014—(EP) Office Action—App 13159607.4.
Oct. 20, 2014—U.S. Notice of Allowance—U.S. Appl. No. 13/833,236.
Dec. 12, 2014—U.S. Notice of Allowance—U.S. Appl. No. 13/834,423.
Information Technology—Telecommunications and information exchange between systems—Near Field Communication Interface and Protocol-2 (NFCIP-2), ISO/IEC 21481, Second edition, Jul. 1, 2012.
Information Technology—Telecommunications and information exchange between systems—Near Field Communication—Interface and Protocol (NFCIP-1), ISO/IEC 18092, Second edition, Mar. 15, 2013.
Mar. 13, 2014—(US) Co-pending U.S. Appl. No. 14/208,220.
Nosowitz, D., "Everything You Need to Know about Near Field Communication," Popular Science, posted Mar. 1, 2011.
Mar. 31, 2015—U.S. Notice of Allowance—U.S. Appl. No. 13/834,423.
Mar. 6, 2015—(CN) Notification of First Office Action—App 201310097370.7.
Apr. 15, 2015—U.S. Non-Final Office Action—U.S. Appl. No. 13/959,786.
Sep. 9, 2014 (US) Co-pending U.S. Appl. No. 14/498,213 as filed.
Requirement for Election issued in U.S. Appl. No. 13/834,423, dated Feb. 24, 2014.
Co-pending U.S. Appl. No. 13/833,236, filed Mar. 15, 2013.
Mar. 26, 2015—(US) Co-pending U.S. Appl. No. 14/669,553.
Sep. 30, 2015—U.S. Notice of Allowance—U.S. Appl. No. 14/208,220.
Oct. 2, 2015—U.S. Final Office Action—U.S. Appl. No. 13/959,786.
Oct. 9, 2015—U.S. Non-Final Office Action—U.S. Appl. No. 14/706,368.
Aug. 31, 2011—NFC Forum, Simple NDEF Exchange Protocol Technical Specification, NFC Forum, SNEP 1.0, NFCForum-TS-SNEP_1.0.
Oct. 8, 2015—(EP) Extended European Search Report—App 15169695.2.

(56) References Cited

OTHER PUBLICATIONS

Dec. 22, 2015—(JP) Notification of Reasons for Rejection—App 2012-082818—Eng Tran.
Dec. 22, 2015—(CN) Notification of First Office action—App 201310339554.X—Eng Tran.
Feb. 17, 2016—U.S. Final Office Action—U.S. Appl. No. 14/706,368.
Mar. 8, 2016—(JP) Notification of Reasons for Rejection—App 2012-173269.
Jan. 25, 2016—U.S. Non-Final Office Action—U.S. Appl. No. 13/957,490.
Apr. 26, 2016—U.S. Non-Final Office Action—U.S. Appl. No. 13/959,786.
May 6, 2016—U.S. Non-Final Office Action—U.S. Appl. No. 13/957,479.
May 11, 2016—U.S. Notice of Allowance—U.S. Appl. No. 14/706,368.
May 6, 2016—U.S. Non-Final Office Action—U.S. Appl. No. 14/208,220.
Mar. 1, 2016—(JP) Notice of Reasons for Rejection—App 2012-193091—Eng Tran.
Jan. 29, 2016—U.S. Notice of Allowance—U.S. Appl. No. 14/663,923.
Jan. 12, 2016—(JP) Notification of Reasons for Rejection—App 2012-082819—Eng Tran.
Jun. 20, 2016—U.S. Final Office Action—U.S. Appl. No. 13/957,490.
May 17, 2016—(JP) Notification of Reasons for Rejection—App 2012-082818—Eng Trans.
May 3, 2016—(CN) Office Action—App 201310084346.X—Eng Tran.
Jun. 22, 2016—U.S. Notice of Allowance—U.S. Appl. No. 14/706,368.
Aug. 9, 2016—U.S. Notice of Allowance—U.S. Appl. No. 13/957,479.
Aug. 11, 2016—U.S. Notice of Allowance—U.S. Appl. No. 13/959,786.
Aug. 23, 2016—U.S. Non-Final Office Action—U.S. Appl. No. 14/498,213.
Jul. 7, 2010—NFC Forum Connection Handover Technical Specification 1.2.
Aug. 24, 2016—U.S. Notice of Allowance—U.S. Appl. No. 14/208,220.
Sep. 6, 2016—U.S. Non-Final Office Action—U.S. Appl. No. 15/132,432.
Aug. 31, 2011—NFC Forum Simlple NDEF Exchange Protocol.
U.S. Appl. No. 61/601,496, filed Feb. 21, 2012, Specification.
U.S. Appl. No. 61/601,496, filed Feb. 21, 2012, Drawings.
Nov. 3, 2016—U.S. Non-Final Office Action—U.S. Appl. No. 15/162,995.
Nov. 2, 2016—U.S. Non-Final Office Action—U.S. Appl. No. 14/669,553.
Nov. 18, 2016—U.S. Notice of Allowance—U.S. Appl. No. 14/208,220.
Dec. 6, 2016—U.S. Notice of Allowance—U.S. Appl. No. 14/706,368.
Dec. 2, 2016—U.S. Notice of Allowance—U.S. Appl. No. 13/957,479.
Dec. 22, 2016—U.S. Notice of Allowance—U.S. Appl. No. 13/957,490.
Nov. 25, 2016—(CN) Office Action—App 201310084346.X—Eng Tran.
Feb. 7, 2017—(JP) Notification of Reasons for Rejection—App 2013-204535—Eng Trans.
Mar. 1, 2017—U.S. Notice of Allowance—U.S. Appl. No. 15/162,995.
Mar. 3, 2017—U.S. Notice of Allowance—U.S. Appl. No. 15/132,432.
Mar. 29, 2017—U.S. Notice of Allowance—U.S. Appl. No. 15/283,829.
Mar. 23, 2017—U.S. Final Office Action—U.S. Appl. No. 14/669,553.
Apr. 21, 2017—U.S. Final Office Action—U.S. Appl. No. 14/498,213.
May 4, 2017—U.S. Non-Final Office Action—U.S. Appl. No. 15/287,054.
May 16, 2017—U.S. Notice of Allowance—U.S. Appl. No. 14/706,368.
Jun. 1, 2017—U.S. Notice of Allowance—U.S. Appl. No. 15/283,829.
May 4, 2017—U.S. Office Action—U.S. Appl. No. 15/287,054.
Jul. 18, 2017—(JP) Notification of Rejection—App 2016-156230—Eng Tran.
Aug. 1, 2017—U.S. Notice of Allowance—U.S. Appl. No. 14/669,553.
Aug. 2, 2017—(EP) Office Action—App 13174778.4.
Jul. 27, 2017—(EP) Office Action—App 13161732.6.
Aug. 15, 2017—U.S. Non-Final Office Action—U.S. Appl. No. 14/498,213.
Sep. 1, 2017—U.S. Notice of Allowance—U.S. Appl. No. 15/287,054.
Sep. 27, 2017—U.S. Notice of Allowance—U.S. Appl. No. 15/617,354.
Oct. 17, 2017—U.S. Non-final Office Action—U.S. Appl. No. 15/691,214.
Nov. 24, 2017—U.S. Notice of Allowance—U.S. Appl. No. 14/669,553.
Jan. 17, 2018—U.S. Non-Final Office Action—U.S. Appl. No. 15/609,339.
Jan. 30, 2018—U.S. Final Office Action—U.S. Appl. No. 14/498,213.
Mar. 6, 2018—(JP) Notification of Rejection—App 2017--000214—Eng Tran.
Feb. 19, 2019—(JP) Notification of Reasons for Rejection—App 2018-041165, Eng Tran.
Mar. 20, 2018—(JP) Notification of Rejection—App 2014-113107—Eng Tran.
Apr. 2, 2018—U.S. Final Office Action—U.S. Appl. No. 15/691,214.
May 25, 2018—U.S. Notice of Allowance—U.S. Appl. No. 15/609,339.
Apr. 28, 2018—(CN) First Office Action—App 201610330026.1, Eng Tran.
Jun. 6, 2018—U.S. Notice of Allowance—U.S. Appl. No. 14/669,553.
Jun. 15, 2018—U.S. Notice of Allowance—U.S. Appl. No. 14/498,213.
Jul. 10, 2018—(JP) Notification of Reasons for Rejection—App 2017-157066—Eng Tran.
Jan. 21, 2019—(CN) Notification of the Second Office Action—App 201610330026.1.
Feb. 8, 2019—U.S. Notice of Allowance—U.S. Appl. No. 15/855,216.
Mar. 4, 2019—(EP) Summons to Attend Oral Proceedings—App 13161732.6.
Sep. 13, 2019—U.S. Notice of Allowance—U.S. Appl. No. 15/904,973.
Oct. 16, 2019—U.S. Notice of Allowance—U.S. Appl. No. 16/130,755.
Oct. 23, 2019—(JP) Notification of Reasons for Rejection—App 2018-221816.
Jun. 4, 2019—(CN) Office Action—App 201510279268.8.
Apr. 16, 2020—U.S. Notice of Allowance—U.S. Appl. No. 16/299,640.
Apr. 13, 2010—(CN) The Second Office Action—App 201510279268.8, Eng Tran.
Sep. 10, 2020—(US) Notice of Allowance—U.S. Appl. No. 16/743,033.

\* cited by examiner

COMMUNICATION DEVICE

CROSS-REFERENCE TO RELATED APPLICATIONS

This application is a continuation of U.S. patent application Ser. No. 15/584,056 filed May 2, 2017 which is a divisional of U.S. patent application Ser. No. 13/834,434 filed Mar. 15, 2013, issued as U.S. Pat. No. 9,787,363 on Oct. 10, 2017, which claims priority to Japanese Patent Application No. 2012-082819, filed on Mar. 30, 2012, the contents of which are hereby incorporated by reference into the present application.

TECHNICAL FIELD

The technology disclosed in the present specification relates to a communication device that communicates target data that is a target of communication, with an external device according to an NFC (an abbreviation of Near Field Communication) scheme, which is a communication scheme complying with an NFC standard.

DESCRIPTION OF RELATED ART

A conventional technology used for executing wireless communication by two communication devices has been known. In this technology, the two communication devices communicate communication information wirelessly according to the NFC scheme. The communication information includes information used for executing the wireless communication according to a communication scheme (such as IEEE 802.11a) different from the NFC scheme (i.e., information indicating the communication scheme, information indicating an encryption scheme). With this technology, the two communication devices can execute the wireless communication in accordance with the communication scheme different from the NFC scheme.

SUMMARY

The present specification provides a technology for allowing a communication device to appropriately communicate target data that is a target of communication, with an external device according to the NFC scheme.

In one aspect of the teachings disclosed herein, a communication device configured to communicate target data that is a target of communication with an external device according to an NFC (Near Field Communication) scheme may be provided. The NFC scheme may be a scheme complying with an NFC standard. The communication device may comprise an NFC interface configured to execute NFC scheme communication; a processor; and a memory configured to store a computer program. According to the computer program, the processor may be configured to execute a first establishing step, a first communicating step, a disconnecting step, a second establishing step, and a second communicating step. The first establishing step communicates a first establishing command with the external device via the NFC interface so as to establish a first communication link between the communication device and the external device. The first communicating step may communicate first target data with the external device via the NFC interface by using the first communication link. The disconnecting step may disconnect the first communication link after communicating the first target data with the external device. The second establishing step may communicate a second establishing command with the external device via the NFC interface after disconnecting the first communication link, so as to establish a second communication link between the communication device and the external device. The second communicating step may communicate second target data with the external device via the NFC interface by using the second communication link, the second target data being data generated by processing the first target data.

A non-transitory computer-readable storage medium storing a computer program for a communication device configured to communicate target data that is a target of communication with an external device according to an NFC scheme is also novel and useful.

Figure 1:
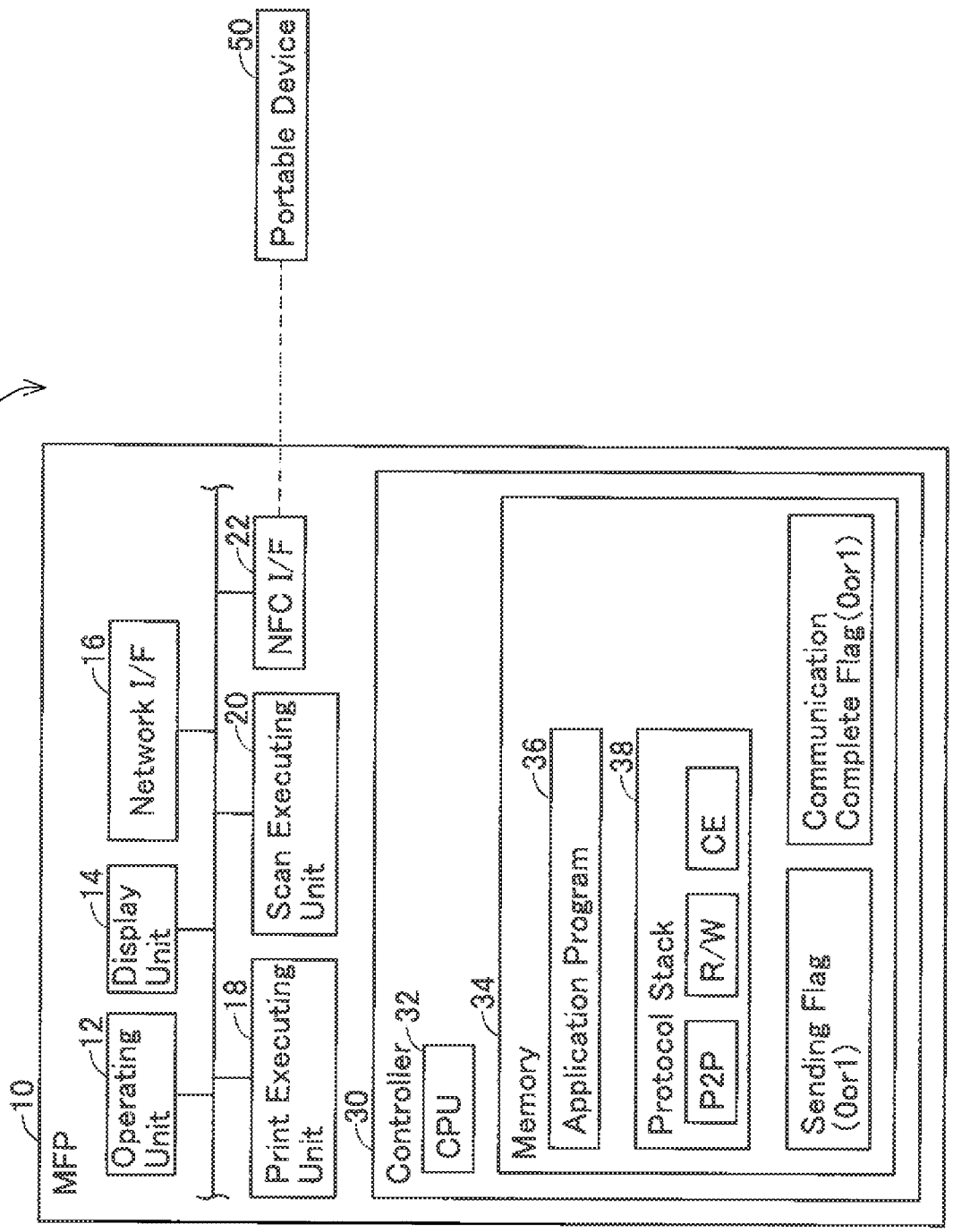
FIG. 1 shows a configuration of a communication system.

EMBODIMENT (Configuration of Communication System 2)
As shown in FIG. 1, a communication system 2 has a multi-function peripheral ("MFP," hereinafter) 10 and a portable device 50. The MFP 10 and the portable device 50 are capable of executing communication in accordance with a communication scheme (i.e., an NFC scheme) complying with the NFC standard. In the present embodiment, the NFC standard is ISO/IEC 21481 or ISO/IEC 18092 international standard level. The NFC scheme communication is wireless communication using a radio wave of 13.56 MHz band. The MFP 10 and the portable device 50 are each capable of executing wire communication or wireless communication by using a communication network different from a communication link according to the NFC scheme.

(Configuration of MFP 10)
The MFP 10 has an operating unit 12, a display unit 14, a network interface (described as "I/F," hereinafter) 16, a print executing unit 18, a scan executing unit 20, an NFC I/F 22, and a controller 30. The operating unit 12 has a plurality of keys. A user can input various instructions to the MFP 10 by operating the operating unit 12. The display unit 14 is a display for displaying various pieces of information. The network I/F 16 may be an I/F connected to a wired network or an I/F connected to a wireless network. Note that this wireless network is a network for executing wireless communication different from the NFC scheme communication, the network complying with, for example, an IEEE (an abbreviation of Institute of Electrical and Electronics Engineers, Inc.) 802.11 standard and a standard equivalent thereto (e.g., 802.11a, 11b, 11g, 11n). The print executing unit 18 is an inkjet or laser printing mechanism. The scan executing unit 20 is a scan mechanism such as a CCD or CIS.

The NFC I/F 22 is an interface for executing the NFC scheme communication. The NFC I/F 22 is configured by a chip different from the network I/F 16. Note that, in a case where the network I/F 16 is an I/F connected to a wireless network, the network I/F 16 and the NFC I/F 22 differ from each other in terms of the following points.

In other words, the speed of wireless communication using the network I/F 16 is higher than the speed of wireless communication using the NFC I/F 22. The frequency of a carrier wave in the wireless communication performed using the network I/F 16 is different from the frequency of a carrier wave in the wireless communication performed using the NFC I/F 22. When the distance between the MFP 10 and the portable device 50 is approximately 10 cm or less, the MFP 10 can execute the NFC scheme communication with the portable device 50 using the NFC I/F 22. On the other hand, even when the distance between the MFP 10 and the portable device 50 is equal to or greater than 10 cm, or equal to or less than 10 cm, the MFP 10 can execute the wireless communication with the portable device 50 using the network I/F 16. In other words, the maximum distance in which the MFP 10 can execute the wireless communication with a communication-destination device (e.g., the portable device 50) via the network I/F 16 is greater than the maximum distance in which the MFP 10 can execute the wireless communication with the communication-destination device via the NFC I/F 22. It should be noted that the wireless communication using the network I/F 16 is referred to as "network wireless communication" hereinafter.

The controller 30 has a CPU 32 and a memory 34. The CPU 32 executes various processes in accordance with programs 36, 38 stored in the memory 34. The memory 34 is configured by a ROM, a RAM, a hard disk, and the like. The memory 34 stores therein the programs 36, 38 that are executed by the CPU 32. The application program 36 is a program executed by the CPU 32 to process an application layer of the OSI reference model.

The protocol stack 38 is a program executed by the CPU 32 to process a layer lower than the application layer of the OSI reference model. Note that the protocol stack 38 includes a P2P (an abbreviation of Peer to Peer) program, a R/W program, and a CE program. The P2P program is a program for executing a process according to a P2P-mode of the NFC standard. The R/W program is a program for executing a process according to a Reader/Writer-mode of the NFC standard. The CE program is a program for executing a process according to a CE (an abbreviation of Card Emulation) mode of the NFC standard. These programs are used for executing processes complying with the NFC standards defined by the NFC forum.

The memory 34 also stores "0" or "1" as a sending flag. The sending flag indicates whether or not the MFP 10 is to send the target data that is a target of communication. Specifically, in a situation in which the MFP 10 is to send the target data, the sending flag is set at "1." In a situation in which the MFP 10 is not to send the target data, the sending flag is set at "0."

The memory 34 also stores "0" or "1" as a communication complete flag. As will be described hereinafter, the NFC scheme communication is performed between the MFP 10 and the portable device 50 where first target data is sent from one of the devices to the other, and thereafter NFC scheme communication is performed therebetween where second target data is sent from the other device to the one device. Hereinafter, this process of executing the communication of the first target data and thereafter the communication of the second target data is referred to as "one set of communication." The communication complete flag indicates whether the first target data is communicated or not in the one set of communication. In other words, in a situation in which the first target data is communicated, the communication complete flag is set at "1." In a situation in which the first target data is not communicated, the communication complete flag is set at "0."

(Configuration of Portable Device 50)

The portable device 50 is, for example, a cellular phone (e.g., a smartphone), a PDA, a laptop, a tablet PC, a portable music reproducer, a portable video reproducer, or the like. The portable device 50 has the network I/F for connecting to the wireless network and the NFC I/F. The portable device 50 is capable of executing the wireless communication with the MFP 10 via either the network I/F or the NFC I/F.

The portable device 50 has an application program ("MFP application," hereinafter) for causing the MFP 10 to execute various functions (e.g., a printing function, a scanning function, etc.). Note that the MFP application may be installed on the portable device 50 from, for example, a server provided by a vendor of the MFP 10 or installed on the portable device 50 from a medium shipped along with the MFP 10.

(Target Data that is a Target of Communication)

Various types of data can be considered as the first and second target data to be communicated in the one set of communication described above. Examples of the first and second target data are as follows.

First Example

A situation is simulated in which the MFP 10 is to receive print data from the portable device 50 to execute the printing function according to the print data. The user of the portable device 50 activates the MFP application of the portable device 50 and inputs to the portable device 50 an instruction for causing the MFP 10 to execute the printing function. In this case, the portable device 50 uses the NFC scheme communication to send the print execution instruction to the MFP 10. The print execution instruction does not include the print data.

The MFP 10 receives the print execution instruction from the portable device 50 via the NFC I/F 22. As mentioned above, the speed of the NFC scheme communication is lower than the speed of the network wireless communication. For this reason, if the NFC scheme communication is used for communicating the print data from the portable device 50 to the MFP 10, it might take a long time to communicate the print data. The present example, therefore, adopts a configuration in which the MFP 10 receives the print data from the portable device 50 by using the network wireless communication. In order to adopt such a configuration, the portable device 50 needs to know wireless settings for executing the network wireless communication with the MFP 10. Thus, when receiving the print execution instruction from the portable device 50, the MFP 10 sends a response including the wireless settings described above to the portable device 50 via the NFC I/F 22.

In this manner, the MFP 10 and the portable device 50 can communicate the print data by executing the network wireless communication in place of the NFC scheme communication. As a result, the MFP 10 can execute the printing function. In the present example, the print execution instruction and the response including the wireless settings are the examples of "first target data" and "second target data," respectively.

Second Example

A situation is simulated in which the MFP 10 is to execute the scanning function of scanning and generating scan data to send the scan data to the portable device 50. The user of the portable device 50 activates the MFP application of the portable device 50 and inputs to the portable device 50 an instruction for causing the MFP 10 to execute the scanning function. In this case, the portable device 50 uses the NFC scheme communication to send the scan execution instruction to the MFP 10.

The MFP 10 receives the scan execution instruction from the portable device 50 via the NFC I/F 22. Similarly to the first example mentioned above, if the NFC scheme communication is used for communicating the print data from the MFP 10 to the portable device 50, it might take a long time to communicate the scan data. The present example, therefore, adopts a configuration in which the MFP 10 sends the scan data to the portable device 50 by using the network wireless communication. Thus, when receiving the scan execution instruction from the portable device 50, the MFP 10 sends a response including the wireless settings to the portable device 50 via the NFC I/F 22.

In this manner, the MFP 10 and the portable device 50 can communicate the scan data by executing the network wireless communication in place of the NFC scheme communication. As a result, the MFP 10 can execute the scanning function. In the present example, the scan execution instruction and the response including the wireless settings are the examples of "first target data" and "second target data," respectively.

Third Example

A situation is simulated in which the portable device 50 is to send, to the MFP 10, setting information to be used by the MFP 10. Examples of the setting information include print setting information used when the MFP 10 executes the printing function (e.g., print resolution, paper size, etc.), scan setting information used when the MFP 10 executes the scanning function (e.g., scanning resolution, etc.), and communication setting information used when the MFP 10 executes a communication function (e.g., an IP address, subnet mask, gateway address, etc.).

The user of the portable device 50 activates the MFP application of the portable device 50 and inputs to the portable device 50 the setting information to be used by the MFP 10. In this case, the portable device 50 sends the setting information to the MFP 10 by using the NFC scheme communication.

The MFP 10 receives the setting information from the portable device 50 via the NFC I/F 22. The MFP 10 stores the received setting information in the memory 34 as the setting information to be used by the MFP 10. Consequently, the MFP 10 can execute various functions by using the received setting information. When receiving the setting information from the portable device 50, the MFP 10 sends a response indicating the receipt of the setting information to the portable device 50 via the NFC I/F 22. In the present example, the setting information and the response are the examples of the "first target data" and the "second target data," respectively.

Fourth Example

A situation is simulated in which the portable device 50 is to send, to the MFP 10, address information included in an address book that is currently used. The user of the portable device 50 activates the MFP application of the portable device 50 and inputs to the portable device 50 an instruction for sending the address information to the MFP 10. In this case, the portable device 50 sends the address information to the MFP 10 by using the NFC scheme communication.

The MFP 10 receives the address information from the portable device 50 via the NFC I/F 22. The MFP 10 adds the received address information to the address book currently used in the MFP 10 (i.e., the address book within the memory 34). Consequently, the MFP 10 can execute the communication function by using the received address information. When receiving the address information from the portable device 50, the MFP 10 sends a response indicating the receipt of the address information to the portable device 50 via the NFC I/F 22. In the present example, the address information and the response are the examples of the "first target data" and the "second target data," respectively.

Fifth Example

The first example described above adopts a configuration in which the MFP 10 sends the print data to the portable device 50 by using the network wireless communication. Instead, for example, the MFP 10 may receive the print data from the portable device 50 via the NFC I/F 22. In this case, the MFP 10 may send a response indicating the receipt of the print data to the portable device 50 via the NFC I/F 22. In the present example, the print data and the response are the examples of the "first target data" and the "second target data," respectively.

Sixth Example

In the first to fifth examples described above, in the one set of communication the first target data is sent from the portable device 50 to the MFP 10 and then the second target data is sent from the MFP 10 to the portable device 50. However, in the one set of communication, the first target data may be sent from the MFP 10 to the portable device 50 and then the second target data may be sent from the portable device 50 to the MFP 10. For example, the MFP 10 may send scan data to the portable device 50 via the NFC I/F 22 and receive a response from the portable device 50 via the NFC I/F 22. In the present example, the scan data and the response are the examples of the "first target data" and the "second target data," respectively.

Note that the combination of the "first target data" and the "second target data" is not limited to those described in the first to sixth examples and therefore may be a different combination. In other words, the "first target data" may be any type of data as long as the data is the target of communication, and the "second target data" may also be any type of data as long as the data (i.e., data different from the first target data) is generated by processing the first target data. It should be noted that a subject generating the second target data may be the MFP 10 or the portable device 50.

(Modes of NFC Standard)

Each of the modes adopted by the NFC standard is described next. According to the NFC standard, the P2P-mode, the Reader/Writer-Mode (simply described as "R/W-mode" hereinafter), and the CE-mode are used. Note that the devices capable of executing the NFC scheme communication (the MFP 10, the portable device 50, etc.) are referred to as "NFC devices," hereinafter.

Among the NFC devices, there exists a device capable of using all of the three modes, as well as a device capable of using one or two of the three modes. In the present embodiment, the MFP 10 is the device capable of using all of the three modes. On the other hand, the portable device 50 may be capable of using all of the three modes or two of the three modes such as the R/W-mode and the CE-mode.

(P2P-Mode)

The P2P-mode is a mode for executing bidirectional communication between a pair of NFC devices. For example, a situation is simulated in which a first NFC device and a second NFC device are operated according to the P2P-mode. In this case, a communication link for executing communication according to the P2P-mode is established between the first NFC device and the second NFC device. For instance, the first NFC device sends data to the second NFC device by using the communication link. Subsequently, the second NFC device normally sends another data to the first NFC device by using the same communication link. In this manner, the bidirectional communication is realized. While an NFC device, a tag type of which defined by the NFC forum is type A, and an NFC device of tag type F, can be operated according to the P2P-mode, an NFC device of tag type B cannot be operated according to the P2P-mode.

(R/W-Mode, CE-Mode)

The R/W-mode and the CE-mode are modes for executing unidirectional communication between a pair of NFC devices. The CE-mode is a mode in which each of the NFC devices is operated as a "card," a format defined by the NFC forum. Thereinbelow, such a "card" may be termed a "pseudo card". The NFC device of the tag type A, the NFC device of the tag type F, and the NFC device of the tag type B can be operated according to the CE-mode. The R/W mode is also classified into Reader- and Writer-modes. The Reader-mode is a mode for reading data from the NFC devices operated as the cards in the CE-mode. The Writer-mode is a mode for writing data into the NFC devices operated as the cards in the CE-mode. Note that, in the Reader-mode, the data can be read from a card complying with the NFC standard. Moreover, in the Writer-mode, data can be written into the card complying with the NFC standard.

For example, a situation is simulated in which the first NFC device is operated according to the Reader-mode and the second NFC device is operated according to the CE-mode. In this case, a communication link for executing communication according to the Reader-mode and the CE-mode is established between the first NFC device and the second NFC device. The first NFC device executes an operation for reading data from a pseudo card of the second NFC device, and thereby receives the data from the second NFC device.

For example, a situation is simulated in which the first NFC device is operated according to the Writer-mode and the second NFC device is operated according to the CE-mode. In this case, a communication link for executing communication according to the Writer-mode and the CE-mode is established between the first NFC device and the second NFC device. The first NFC device executes an operation for writing data in a pseudo card of the second NFC device, and thereby sends the data to the second NFC device.

As described above, various combinations of the modes can be considered in order for a pair of NFC devices to execute the NFC scheme communication. For example, the following five patterns can be considered as a combination of the modes of the MFP 10 and the portable device 50: "P2P-mode, P2P-mode," "Reader-mode, CE-mode," "Writer-mode, CE-mode," "CE-mode, Reader-mode," and "CE-mode, Writer-mode."

(Poll-Operation and Listen-Operation)

The NFC devices are capable of executing a Poll-operation and a Listen-operation. More specifically, in the MFP 10, for example, instead of causing the CPU 32 to execute the Poll-operation and the Listen-operation in accordance with the programs 36, 38, the NFC I/F 22 executes the Poll-operation and the Listen-operation. The Poll-operation is an operation for sending a polling signal and receiving a response signal responsive to the polling signal. The Listen-operation is an operation for receiving a polling signal and sending a response signal responsive to the polling signal.

The NFC I/F 22 of the MFP 10 is capable of being operated in any of the following modes: a Poll-mode for executing the Poll-operation, a Listen-mode for executing the Listen-operation, and a mode for executing neither the Poll-operation nor the Listen-operation (referred to as "no-execution mode," hereinafter). The NFC I/F 22 is operated in the Poll-mode, the Listen-mode, and the no-execution mode sequentially. For example, the NFC I/F 22 executes one set of operations in which the operations are performed in the Poll-mode, subsequently in the Listen-mode, and then in the no-execution mode. The NFC I/F 22 repeatedly executes this one set of operations.

In the Poll-mode, the NFC I/F 22 sends a polling signal and monitors receipt of a response signal. Specifically, the NFC I/F 22 (1) sends a polling signal to which the NFC device of the tag type A can respond (i.e., a polling signal corresponding to the type A), and monitors receipt of a response signal for a predetermined period of time. (2) When not receiving the response signal, the NFC I/F 22 sends a polling signal to which the NFC device of the tag type B can respond (i.e., a polling signal corresponding to the type B), and monitors receipt of a response signal for a predetermined period of time. (3) When not receiving the response signal, the NFC I/F 22 sends a polling signal to which the NFC device of the tag type F can respond (i.e., a polling signal corresponding to the type F), and monitors receipt of a response signal for a predetermined period of time. The NFC I/F 22 repeats these operations. When the NFC I/F 22 receives the response signal from any of the NFC devices within a predetermined period of time, this NFC device is considered the type of NFC device corresponding to the polling signal that is received immediately before the response signal is sent. When receiving the response signal, the NFC I/F 22 further sends an inquiry signal to the NFC device to inquire in which mode the NFC device, to which the response signal is sent, can be operated. As a result, the NFC I/F 22 receives an operable mode signal from this NFC device. The operable mode signal indicates that the NFC device can be operated in the P2P-mode and the CE-mode or that the NFC device can be operated only in the CE-mode.

In the Listen-mode, the NFC I/F 22 monitors receipt of a polling signal, and, when receiving the polling signal, sends a response signal. Only when receiving the type of polling signal corresponding to the NFC I/F 22, the NFC I/F 22 sends a response signal to the NFC device that had sent the polling signal. When sending the response signal to the NFC device, the NFC I/F 22 receives the inquiry signal from the NFC device and sends the operable mode signal to the NFC device. In the no-execution mode, the NFC I/F 22 does not send a polling signal, and does not send a response signal even when a polling signal is received.

The portable device 50 also repeatedly executes the one set of operations described above. Therefore, when, for example, the distance between the MFP 10 and the portable device 50 is less than 10 cm and a period during which the NFC I/F 22 is operated in the Poll-mode is equivalent to a period during which the portable device 50 is operated in the Listen-mode, the NFC I/F 22 executes the Poll-operation of sending a polling signal to the portable device 50 and receiving a response signal from the portable device 50. Furthermore, when, for example, the distance between the MFP 10 and the portable device 50 is less than 10 cm and a period during which the NFC I/F 22 is operated in the Listen-mode is equivalent to a period during which the portable device 50 is operated in the Poll-mode, the NFC I/F 22 executes the Listen-operation of receiving a polling signal from the portable device 50 and sending a response signal to the portable device 50.

Once the NFC I/F 22 executes the Poll-operation or the Listen-operation, each of processes required for performing the subsequent communication is succeeded to the CPU 32. Specifically, when the NFC I/F 22 of the MFP 10 executes the Poll-operation and the portable device 50 executes the Listen-operation, information indicating the operation of a certain mode that can be executed by the portable device 50 (i.e., information indicated by a receipt complete operable mode signal) is delivered from the NFC I/F 22 to the CPU 32. Based on the information delivered from the NFC I/F 22, the CPU 32 determines in which mode the MFP 10 is to be operated. Specifically, in a case where the MFP 10 can be operated in any of the modes and the receipt complete operable mode signal indicates the operability in the P2P-mode and the CE-mode, the CPU 32 determines that the MFP 10 is to be operated in the P2P-mode. In this case in a modification, the CPU 32 may determine that the MFP 10 is to be operated in the CE-mode. Moreover, when the MFP 10 can be operated in any of the modes and the receipt complete operable mode signal indicates the operability only in the CE-mode, the CPU 32 determines that the MFP 10 is to be operated in the R/W-mode. Suppose that the MFP 10 can be operated only in the R/W mode and that the receipt complete operable mode signal indicates the operability in the CE-mode, the CPU 32 determines that the MFP 10 is to be operated in the R/W-mode. Although described hereinafter in detail, the CPU 32 subsequently sends an activation command to the portable device 50. The activation command corresponds to the mode in which the MFP 10 is to be operated (i.e., the mode determined by the CPU 32) (see S112 in FIG. 4 and S160 in FIG. 5). The activation command is a command adopted according to the NFC standard and is used for establishing a communication link according to the NFC scheme between the MFP 10 and the portable device 50.

Note that the NFC device executing the Poll-operation (referred to as "Poll device," hereinafter) can be operated in the P2P-mode and the R/W-mode in accordance with the NFC standard but cannot be operated in the CE-mode. Therefore, when the MFP 10 is the Poll device, the CPU 32 determines that the MFP 10 is to be operated in the P2P-mode or the R/W mode, as described above.

On the other hand, when the NFC I/F22 of the MFP 10 executes the Listen-operation and the portable device 50 executes the Poll-operation, the CPU 32 receives the activation command from the portable device 50. The activation command corresponds to the mode in which the portable device 50 is to be operated (see S10 in FIG. 2). When receiving the activation command corresponding to the P2P-mode, the CPU 32 determines that the MFP 10 is to be operated in the P2P-mode. When receiving the activation command corresponding to the R/W-mode, the CPU 32 determines that the MFP 10 is to be operated in the CE-mode.

Note that the NFC device executing the Listen-operation (referred to as "Listen device," hereinafter) can be operated in the P2P-mode and the CE-mode in accordance with the NFC standard but cannot be operated in the R/W-mode. Therefore, when the MFP 10 is the Listen device, the CPU 32 determines that the MFP 10 is to be operated in the P2P-mode or the CE-mode, as described above.

As long as the NFC I/F 22 executes the Poll-operation or the Listen-operation as described above, the CPU 32 can find out not only that the portable device 50 exists in the vicinity of the MFP 10, but also that in which mode the MFP 10 is to be operated. The CPU 32 then executes each of the processes required for performing the subsequent communication (see FIGS. 2 to 5 described hereinafter).

(Processes Executed by MFP 10; FIGS. 2 to 5)

Processes executed by the MFP 10 are described next with reference to FIGS. 2 to 5. Note that the CPU 32 executes each of the processes shown in FIGS. 2 to 5 in accordance with the programs 36, 38 stored in the memory 34. First of all, contents of processes that are executed by the CPU 32 when the NFC I/F 22 executes the Listen-operation (FIGS. 2 and 3; referred to as "Listen-process of MFP," hereinafter) are described, and then contents of processes that are executed by the CPU 32 when the NFC I/F 22 executes the Poll-operation (FIGS. 4 and 5; referred to as "Poll-process of the MFP," hereinafter) are described.

Figure 2:
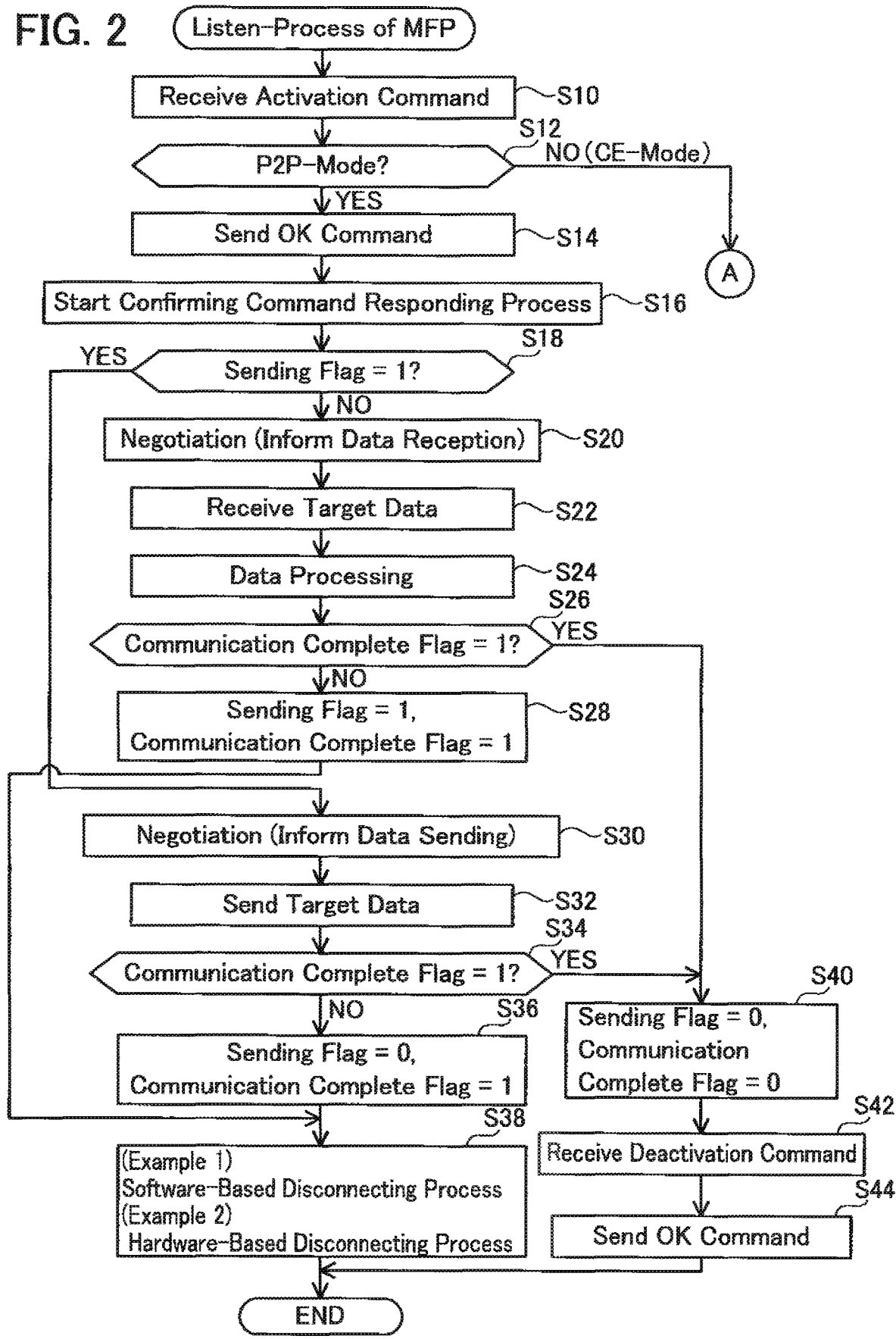
FIG. 2 shows a flowchart of a Listen-process of MFP.
Figure 3:
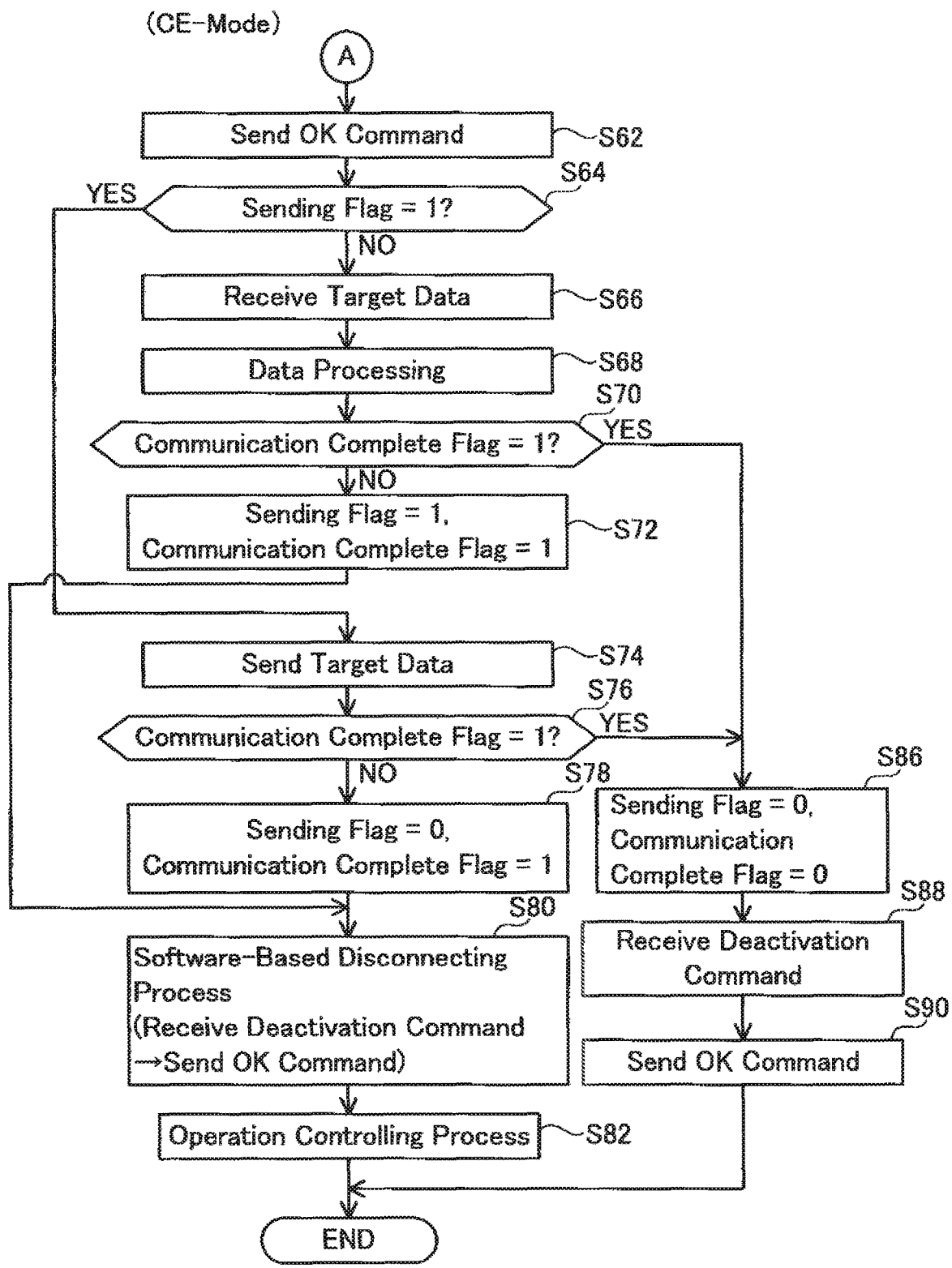
FIG. 3 shows a flowchart following the one shown in FIG. 2.

(Listen-Process of MFP; FIGS. 2 and 3)

As described above, in a case where the NFC I/F 22 executes the Listen-operation (i.e., the portable device 50 executes the Poll-operation), the portable device 50 sends the activation command to the MFP 10. The activation command corresponds to the mode in which the portable device 50 is to be operated. In S10, the CPU 32 receives the activation command from the portable device 50 via the NFC I/F 22.

Next, in S12, the CPU 32 determines whether the MFP 10 is to be operated in the P2P-mode or the CE-mode. As described above, the MFP 10 is the NFC device capable of using all of the three modes: namely, the P2P-mode, the R/W-mode, and the CE-mode. On the other hand, the portable device 50 may be a device capable of using all of the three modes, or a device capable of using only the R/W-mode and the CE-mode. When receiving the activation command corresponding to the P2P-mode, the CPU 32 determines that the MFP 10 is to be operated in the P2P-mode (YES in S12 of FIG. 2) and proceeds to S14. On the other hand, when receiving the activation command corresponding to the R/W mode, the CPU 32 determines that the MFP 10 is to be operated in the CE-mode (NO in S12 of FIG. 2) and proceeds to S62 shown in FIG. 3.

(Listen-Process of MFP; P2P-Mode)

In S14, the CPU 32 sends a response command (i.e., an OK command) to the portable device 50 via the NFC I/F 22 responsive to the activation command. Consequently, the communication link according to the NFC scheme is established between the MFP 10 and the portable device 50. In other words, the CPU 32 can appropriately establish the communication link by receiving the activation command and sending the OK command.

Note that, in the Listen-process of MFP, the activation command cannot be sent from the MFP 10 to the portable device 50. This is because the Poll device can send the activation command, but the Listen device cannot send the activation command.

Next, in S16, the CPU 32 starts a confirming command responding process. A confirming command is sent from the Poll device to the Listen device to confirm whether or not to maintain the communication link. As described above, the MFP 10 is the Listen device and the portable device 50 the Poll device at the present moment. Thus, in the confirming command responding process, the CPU 32 receives the confirming command from the portable device 50 via the NFC I/F 22 and sends a response command (i.e., an OK command) to the portable device 50 via the NFC I/F 22 responsive to the confirming command.

Although not shown in the flowcharts, once the CPU 32 starts the confirming command responding process in S16, the CPU 32 continues the execution of the confirming command responding process until S38 described hereinafter is executed or until the communication link is disconnected in S44 described hereinafter.

Next, in S18, the CPU 32 determines whether the sending flag stored in the memory 34 is set at "1" or not. In the one set of communication described above, in a situation where the first target data is not communicated, the sending flag is normally set at "0." For example, in the first to fifth examples relating to the target data, the first target data is sent from the portable device 50 to the MFP 10 and the second target data is sent from the MFP 10 to the portable device 50. In this case, in a situation in which the first target data is not communicated, the sending flag is normally set at "0." As a result, the MFP 10 can receive the first target data from the portable device 50 (see S22 and the like). In addition, in such a case, in a situation in which the first target data is communicated, the sending flag is set at "1" (see S28 and the like). As a result, the MFP 10 can send the second target data to the portable device 50, as described hereinafter (see S32 and the like).

However, in the sixth example relating to the target data, the first target data is sent from the MFP 10 to the portable device 50 and the second target data is sent from the portable device 50 to the MFP 10. For instance, when the scan data (i.e., the first target data) is generated in accordance with the sixth example described above, the CPU 32 changes the sending flag from "0" to "1" in a process not shown in any of the flowcharts of FIGS. 2 to 5. In such a case, even in a situation in which the first target data is not communicated in the one set of communication described above, the sending flag is set at "1." As a result, the MFP 10 can send the first target data to the portable device 50, as described hereinafter (see S32 and the like). Furthermore, in such a case, in a situation in which the first target data is communicated, the sending flag is set at "0" (see S36 and the like). As a result, the MFP 10 can receive the second target data from the portable device 50, as described hereinafter (see S22 and the like).

When the sending flag stored in the memory 34 is "1," the CPU 32 determines that the result of S18 is YES and proceeds to S30. On the other hand, when the sending flag stored in the memory 34 is "0," the CPU 32 determines that the result of S18 is NO and proceeds to S20.

In S20, the CPU 32 executes negotiation with the portable device 50 via the NFC I/F 22. Specifically, the CPU 32 first determines that the MFP 10 is operated as a client of the P2P-mode. The CPU 32 then executes communication according to a Simple NDEF Exchange protocol such that the MFP 10 is operated as the client and the portable device 50 as a server of the P2P-mode. Consequently, the portable device 50 is operated as the server that executes processes in response to requests from the client (i.e., the MFP 10). Note that NDEF is an abbreviation of "NFC Data Exchange Format."

In S20, the CPU 32 further informs the portable device 50 that the MFP 10 executes data reception (i.e., that the portable device 50 executes data sending). This allows the portable device 50 to know that the target data is to be sent to the MFP 10, and sends the target data to the MFP 10. Hereinafter, "target data" may correspond to the first target data or the second target data described in any of the first to sixth examples relating to the target data.

Next, in S22, the CPU 32 receives the target data from the portable device 50 via the NFC I/F 22 by using the communication link established in S14.

Subsequently, in S24, the CPU 32 processes the target data received in S22. For instance, in the first or second example described above, the CPU 32 interprets a print execution instruction or scan instruction (i.e., the first target data) received in S22, to generate a response including wireless settings (i.e., the second target data). Additionally, in the third example described above, for instance, the CPU 32 stores the setting information received in S22 (i.e., the first target data) in the memory 34 and generates a response indicating the receipt of the setting information (i.e., the second target data). In the fourth example described above, for instance, the CPU 32 adds address information received in S22 (i.e., the first target data) to an address book of the memory 34 and generates a response indicating the receipt of the address information (i.e., the second target data). In the fifth example described above, for instance, the CPU 32 executes the printing function in accordance with the print data received in S22 (i.e., the first target data) and generates a response indicating the receipt of the print data (i.e., the second target data).

For instance, in the sixth example described above, the CPU 32 interprets the response received in S22 (i.e., the second target data) and confirms that the portable device 50 has received the scan data. In this case, unlike in the first to fifth examples described above, the CPU 32 does not execute the process for generating the second target data. In other words, the second target data is the data generated by the portable device 50.

Subsequently, in S26 the CPU 32 determines whether the communication complete flag stored in the memory 34 is set at "1" or not. When the communication complete flag stored in the memory 34 is "1," the CPU 32 determines that the result of S26 is YES and proceeds to S40. When, on the other hand, the communication complete flag stored in the memory 34 is "0," the CPU 32 determines that the result of S26 is NO and proceeds to S28.

In S28, the CPU 32 sets the sending flag stored in the memory 34 at "1" and sets the communication complete flag stored in the memory 34 at "1." The CPU 32 then proceeds to S38 after S28 is ended.

In S38, the CPU 32 executes a disconnecting process for disconnecting the communication link established in S14. Two methods can be considered as a method for the disconnecting process of S38: a software-based disconnecting process and a hardware-based disconnecting process. The CPU 32 may execute either one of the methods for the disconnecting process.

In a case where the CPU 32 executes the software-based disconnecting process, the CPU 32 ends the confirming command responding process that is started in S16. In other words, even when the confirming command is received from the portable device 50, the CPU 32 does not send a response command (i.e., an OK command) responsive to the confirming command to the portable device 50. Therefore, the portable device 50 can find out that the MFP 10 does not wish to maintain the communication link, and sends to the MFP 10 a deactivation command to disconnect the communication link.

The CPU 32, therefore, receives the deactivation command from the portable device 50 via the NFC I/F 22. In this case, the CPU 32 sends a response command (i.e., an OK command), responsive to the deactivation command, to the portable device 50 via the NFC I/F 22. As a result, the communication link established in S14 is disconnected. The CPU 32 can appropriately disconnect the communication link by executing the software-based disconnecting process (ending the confirming command responding process, receiving the activation command, sending the OK command).

Note that the deactivation command cannot be sent from the MFP 10 to the portable device 50 in the Listen-process of MFP. This is because while the Poll device can send the deactivation command, the Listen device cannot send the deactivation command.

On the other hand, in a case where the CPU 32 executes the hardware-based disconnecting process, the CPU 32 temporarily stops the operations of the NFC I/F 22. More specifically, for example, the CPU 32 sends to the NFC I/F 22 an instruction for stopping the operations of the NFC I/F 22. Consequently, the NFC I/F 22 temporarily stops all of the operations including receiving/sending signals from/to the outside, the Poll-operation, and the Listen-operation. The CPU 32, therefore, can no longer use the NFC I/F 22 to execute the confirming command responding process that was started in S16.

Once the hardware-based disconnecting process is executed, the portable device 50 cannot receive a response command (i.e., an OK command) responsive to the confirming command, as with the case of the software-based disconnecting process. In this case, the portable device 50 sends the deactivation command to the MFP 10 but cannot receive a response command (i.e., an OK command) responsive to the deactivation command because the operations of the NFC I/F 22 of the MFP 10 are stopped. The portable device 50, therefore, determines this situation as a timeout and ends the process of maintaining the communication link (i.e., the process for sending the confirming command, etc.). As a result, the communication link established in S14 is disconnected. The CPU 32 can appropriately disconnect the communication link by executing the hardware-based disconnecting process (i.e., stopping the operations of the NFC I/F 22).

Note that the method of stopping the operations of the NFC I/F 22 is not limited to the method of sending the instruction from the CPU 32 to the NFC I/F 22 described above. For example, the CPU 32 may temporarily stop the operations of the NFC I/F 22 by temporarily stopping supplying power to the NFC I/F 22. This method is also an example of the hardware-based disconnecting process. Once S38 is ended, the Listen-process of MFP is ended.

On the other hand, when the result of S18 is YES (i.e., when the sending flag is "1"), in S30 the CPU 32 executes the negotiation, as with S20, such that the MFP 10 is operated as the client of the P2P-mode and the portable device 50 as the server of the P2P-mode. In S30, the CPU 32 also informs the portable device 50 of that the MFP 10 executes data sending (i.e., that the portable device 50 executes data reception). Consequently, the portable device 50 waits until receiving the target data from the MFP 10.

Figure 4:
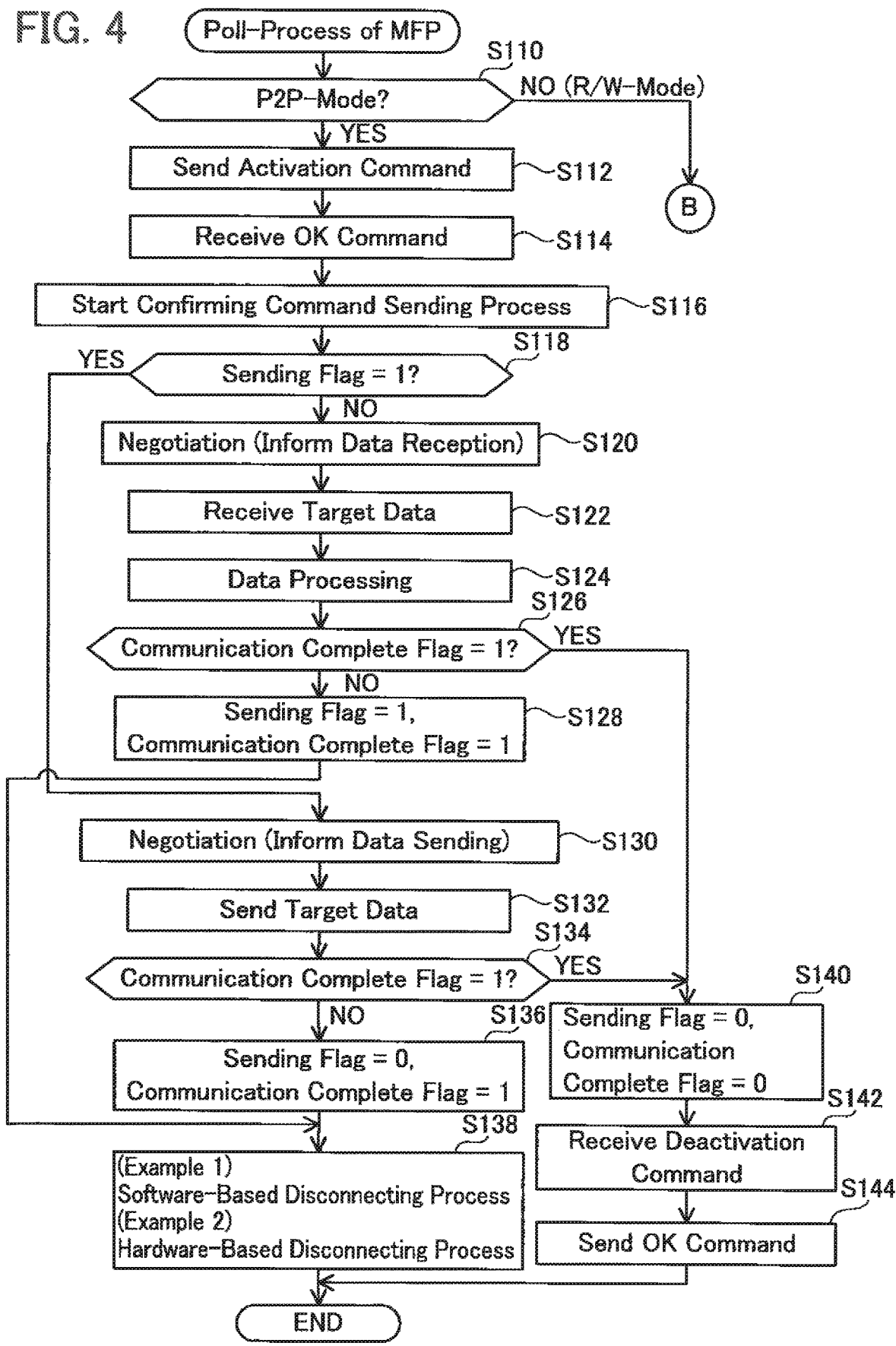
FIG. 4 shows a flowchart of a Poll-process of MFP.

Next, in S32 the CPU 32 sends the target data to the portable device 50 via the NFC I/F 22 by using the communication link established in S14. For example, in the first to fifth examples described above, the CPU 32 processes the first target data to generate the second target data in, for example, S24 of the previous Listen-process of MFP or S124 of the previous Poll-process of MFP (FIG. 4). In this case, in S32 the CPU 32 sends the generated second target data to the portable device 50. Furthermore, in the sixth example described above, for instance, scan data is generated as the first target data. In this case, in S32 the CPU 32 sends the generated first target data to the potable device 50.

Next, in S34 the CPU 32 determines whether the communication complete flag stored in the memory 34 is set at "1" or not. When the communication complete flag stored in the memory 34 is set at "1," the CPU 32 determines that the result of S34 is YES and proceeds to S40. When, on the other hand, the communication complete flag stored in the memory 34 is set at "0," the CPU 32 determines that the result of S34 is NO and proceeds to S36.

In S36 the CPU 32 sets the sending flag stored in the memory 34 at "0" and the communication complete flag stored in the memory 34 at "1." Once S36 is ended, the CPU 32 proceeds to S38 to execute the disconnecting process described above.

On the other hand, in S40 the CPU 32 sets the sending flag stored in the memory 34 at "0" and the communication complete flag stored in the memory 34 at "0".

Note that, when S40 is executed (i.e., when the communication complete flag is set at "1"), communication of the second target data is completed (i.e., the one set of communication described above is completed). The portable device 50, therefore, determines that it is no longer necessary to maintain the communication link, and sends the deactivation command to the MFP 10. As a result, in S42 the CPU 32 receives the deactivation command from the portable device 50 via the NFC I/F 22.

Next, in S44 the CPU 32 sends a response command (i.e., an OK command) to the portable device 50 via the NFC I/F 22 responsive to the deactivation command. As a result, the communication link established in S14 is disconnected. Once S44 is ended, the Listen-process of MFP is ended.

(Listen-Process of MFP; CE-Mode (FIG. 3))

Contents of processes that are executed when the result of S12 of FIG. 2 is determined as NO (when it is determined that the MFP 10 is to be operated in the CE-mode) are described next with reference to FIG. 3. The step S62 is same as S14 shown in FIG. 2. Note that, when the MFP 10 is operated in the CE-mode and the portable device 50 is operated in the R/W-mode, the confirming code responding process (see S16 of FIG. 2) is not executed, unlike the case of the P2P-mode. This is because it is not necessary to confirm whether to maintain the communication link or not, since this mode is for unidirectional communication (i.e., the mode in which the target data is communicated only once).

The steps S64 to S72 are same as S18 and S22 to S28 shown in FIG. 2. The steps S74 to S78 are same as S32 to S36 shown in FIG. 2. The steps S86 to S90 are same as S40 to S44 shown in FIG. 2. Once S90 is ended, the Listen-process for MFP is ended.

In S80, the CPU 32 executes the software-based disconnecting process for disconnecting the communication link established in S62. In other words, the CPU 32 receives the deactivation command from the portable device 50 via the NFC I/F 22 and sends a response command (i.e., an OK command) to the portable device 50 via the NFC I/F 22 responsive to the deactivation command. As a result, the communication link established in S62 is disconnected. The CPU 32 can appropriately disconnect the communication link by executing the software-based disconnecting process (receiving the deactivation command and sending the OK command).

Next, in S82 the CPU 32 executes an operation controlling process for controlling the operations of the NFC I/F 22. The CPU 32 sends an instruction for stopping the operations of the NFC I/F 22 to the NFC I/F 22. Consequently, the NFC I/F 22 temporarily stops all of the operations including receiving/sending signals from/to the outside, the Poll-operation, and the Listen-operation.

Once the communication link is disconnected in S80, the portable device 50 is operated again in the Poll-mode and the Listen-mode sequentially. However, because the operations of the NFC I/F 22 of the MFP 10 are temporarily stopped in S82, the portable device 50 does not receive a response signal even if the polling signal is sent. The portable device 50 also does not receive the polling signal from the MFP 10. For this reason, the portable device 50 can detect that the distance between the MFP 10 and the portable device 50 has increased, i.e., the communication counterpart has seceded.

The reasons that the portable device 50 is caused to detect the secession of the communication counterpart (i.e., that the operation controlling process is executed in S82) are as follows. The communication links corresponding to the CE-mode and the R/W-mode are established under the assumption that the target data is communicated only once. Thus, when a pair of NFC devices communicates the target data in accordance with the CE-mode and the R/W-mode, normally the communication link is disconnected. Subsequently, supposedly when the pair of NFC devices remains close to each other, the pair of NFC devices can execute the Poll-operation and the Listen-operation again, reestablish the communication link, and communicate the same target data. In other words, when the pair of NFC devices remains close to each other, the same target data is communicated for a number of times.

Therefore, when the secession of the communication counterpart is not detected after the communication links corresponding to the CE-mode and the R/W mode are disconnected, the NFC devices are normally programmed so as not to reestablish a communication link even upon executing the Poll-operation and the Listen-operation again. When, for example, the response signal is not received from the communication counterpart no matter how many times the polling signal is sent, or when the polling signal is not received from the communication counterpart for a predetermined period of time, the NFC devices detect the secession of the communication counterpart. By detecting the secession of the communication counterpart in this manner, the NFC devices can reestablish a communication link with the same communication counterpart.

In the present embodiment, communication of the second target data is executed (i.e., the one set of communication is executed) subsequent to the communication of the first target data. Therefore, it is necessary to adopt a mechanism for reestablishing a new communication link for communicating the second data, even when the MFP 10 and the portable device 50 remain close to each other after the communication link for communicating the first target data is disconnected. This mechanism is the operation controlling process of S82. In other words, by causing the MFP 10 to execute the operation controlling process of S82, the portable device 50 can detect secession of the MFP 10, even when the MFP 10 and the portable device 50 remain close to each other. Thereafter, a communication link can be reestablished between the MFP 10 and the portable device 50 as long as the MFP 10 and the portable device 50 execute the Poll-operation and the Listen-operation.

Note that the operation controlling process of S82 is not limited to the method of sending an instruction from the CPU 32 to the NFC I/F 22 described above. For instance, the CPU 32 may temporarily stop the operations of the NFC I/F 22 by temporarily stopping supplying power to the NFC I/F 22. This method is also an example of the operation controlling process. Once S82 is ended, the Listen-process of MFP is ended.

Figure 5:
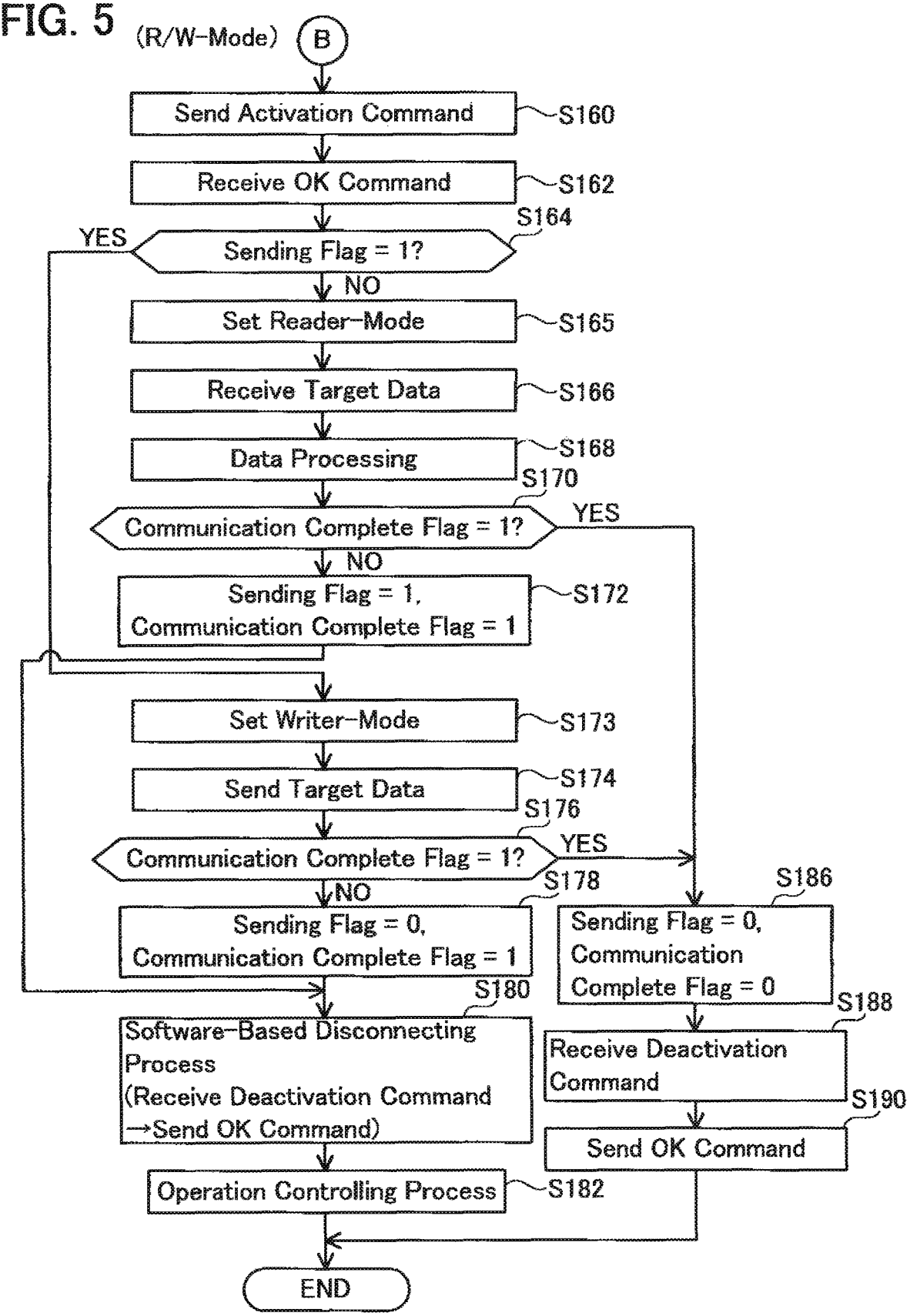
FIG. 5 shows a flowchart following the one shown in FIG. 4.

(Poll-Process of MFP; FIGS. 4 and 5)

Contents of the Poll-process of MFP are described hereinafter with reference to FIGS. 4 and 5. As described above, when the NFC I/F 22 executes the Poll-operation, the MFP 10 is operated in either the P2P-mode or the R/W-mode in accordance with the received operable mode signal. In S110, based on the received operable mode signal, the CPU 32 determines whether the MFP 10 is to be operated in the P2P-mode or the R/W mode. When it is determined that the MFP 10 is to be operated in the P2P-mode (YES in S110), the CPU 32 proceeds to S112. When it is determined that the MFP 10 is to be operated in the R/W-mode (NO in S110), the CPU 32 proceeds to S160 shown in FIG. 5.

(Poll-Process of MFP; P2P-mode (FIG. 4))

In S112, the CPU 32 sends the activation command corresponding to the P2P-mode to the portable device 50 via the NFC I/F 22. Next, in S114, the CPU 32 receives a response command (i.e., an OK command), responsive to the activation command, from the portable device 50 via the NFC I/F 22. As a result, an NFC scheme communication link is established between the MFP 10 and the portable device 50.

Next, in S116, the CPU 32 starts a confirming command sending process. In the confirming command sending process, the CPU 32 sends the confirming command to the portable device 50 via the NFC I/F 22 and receives a response command (i.e., an OK command), responsive to the confirming command, from the portable device 50 via the NFC I/F 22. Note that, once the CPU 32 starts the confirming command sending process in S116, the CPU 32 continues the execution of the confirming command sending process until S138 described hereinafter is executed or until the communication link is disconnected in S144 described hereinafter.

The steps S118 to S128 are same as S18 to S28 shown in FIG. 2. The steps S130 to S136 are same as S30 to S36 shown in FIG. 2. The step S140 is same as S40 shown in FIG. 2. In S142, the CPU 32 sends the deactivation command to the portable device 50 via the NFC I/F 22. Next, in S144, the CPU 32 receives a response command (i.e., an OK command), responsive to the deactivation command, from the portable device 50 via the NFC I/F 22. As a result, the communication link established in S114 is disconnected.

In S138, the CPU 32 executes a disconnecting process for disconnecting the communication link established in S114. Two methods can be considered as a method for the disconnecting process of S138: a software-based disconnecting process and a hardware-based disconnecting process. The CPU 32 may execute either one of the methods for the disconnecting process.

In a case where the CPU 32 executes the software-based disconnecting process, the CPU 32 sends a deactivation command to the portable device 50 via the NFC I/F 22 and receives a response command (i.e., an OK command) from the portable device 50 via the NFC I/F 22 responsive to the deactivation command. As a result, the communication link established in S114 is disconnected. The CPU 32 can appropriately disconnect the communication link by executing the software-based disconnecting process (sending the deactivation command and receiving the OK command).

Note that the software-based disconnecting process is not limited to the method of sending the deactivation command from the CPU 32 described above. For instance, the CPU 32 may end the confirming command sending process started in S116. In other words, the CPU 32 does not send the confirming command to the portable device 50. When not receiving the confirming command from the MFP 10 for a predetermined period of time, the portable device 50 determines this situation as a timeout. The portable device 50 consequently ends the process relating to the communication link (i.e., monitoring reception of the confirming command), resulting in disconnecting the communication link. This method is also an example of the software-based disconnecting process.

On the other hand, in a case where the CPU 32 executes the hardware-based disconnecting process, the CPU 32 temporarily stops the operations of the NFC I/F 22. More specifically, for example, the CPU 32 sends to the NFC I/F 22 an instruction for stopping the operations of the NFC I/F 22. The CPU 32, therefore, can no longer use the NFC I/F 22 to execute the confirming command responding process that is started in S116. In this case, the portable device 50 determines this situation as a timeout and ends the process relating to the communication link (i.e., monitoring reception of the confirming command), resulting in disconnecting the communication link. The CPU 32 can appropriately disconnect the communication link by executing the hardware-based disconnecting process (i.e., stopping the operations of the NFC I/F 22).

Note that the method of stopping the operations of the NFC I/F 22 is not limited to the method of sending the instruction from the CPU 32 to the NFC I/F 22 described above. For example, the CPU 32 may temporarily stop the operations of the NFC I/F 22 by temporarily stopping supplying power to the NFC I/F 22. This method is also an example of the hardware-based disconnecting process. Once S138 is ended, the Listen-process of MFP is ended.

(Poll-Process of MFP; R/W-Mode (FIG. 5))

Contents of processes that are executed when the result of S110 of FIG. 4 is determined as NO (when it is determined that the MFP 10 is to be operated in the R/W-mode) are described next with reference to FIG. 5. The steps S160 to S164 are same as S112, S114, and S118 shown in FIG. 4. In S160, however, the CPU 32 sends the activation command corresponding to the RAY-mode.

When the result of S164 is NO (i.e., when the sending flag is set at "0"), the CPU 32 determines in S165 that the MFP 10 is to be operated according to the Reader-mode. Accordingly, the CPU 32 can read the target data from the pseudo card of the portable device 50, that is, receive the target data from the portable device 50. The steps S166 to S172 that are executed subsequently are same as S66 to S72 shown in FIG. 3.

On the other hand, when the result of S164 is YES (i.e., when the sending flag is set at "1"), the CPU 32 determines in S173 that the MFP 10 is to be operated according to the Writer-mode. The CPU 32 therefore can write the target data into the pseudo card of the portable device 50, that is, send the target data to the portable device 50. The steps S174 to S182 that are executed subsequently are same as S74 to S82 shown in FIG. 3. Note that S186 to S190 are same as S140 to S144 shown in FIG. 4.

(Specific Cases)

Specific cases realized by the present embodiment are described next. Each of the following cases is realized by allowing the MFP 10 to execute each of the processes shown in FIGS. 2 to 5.

Figure 6:
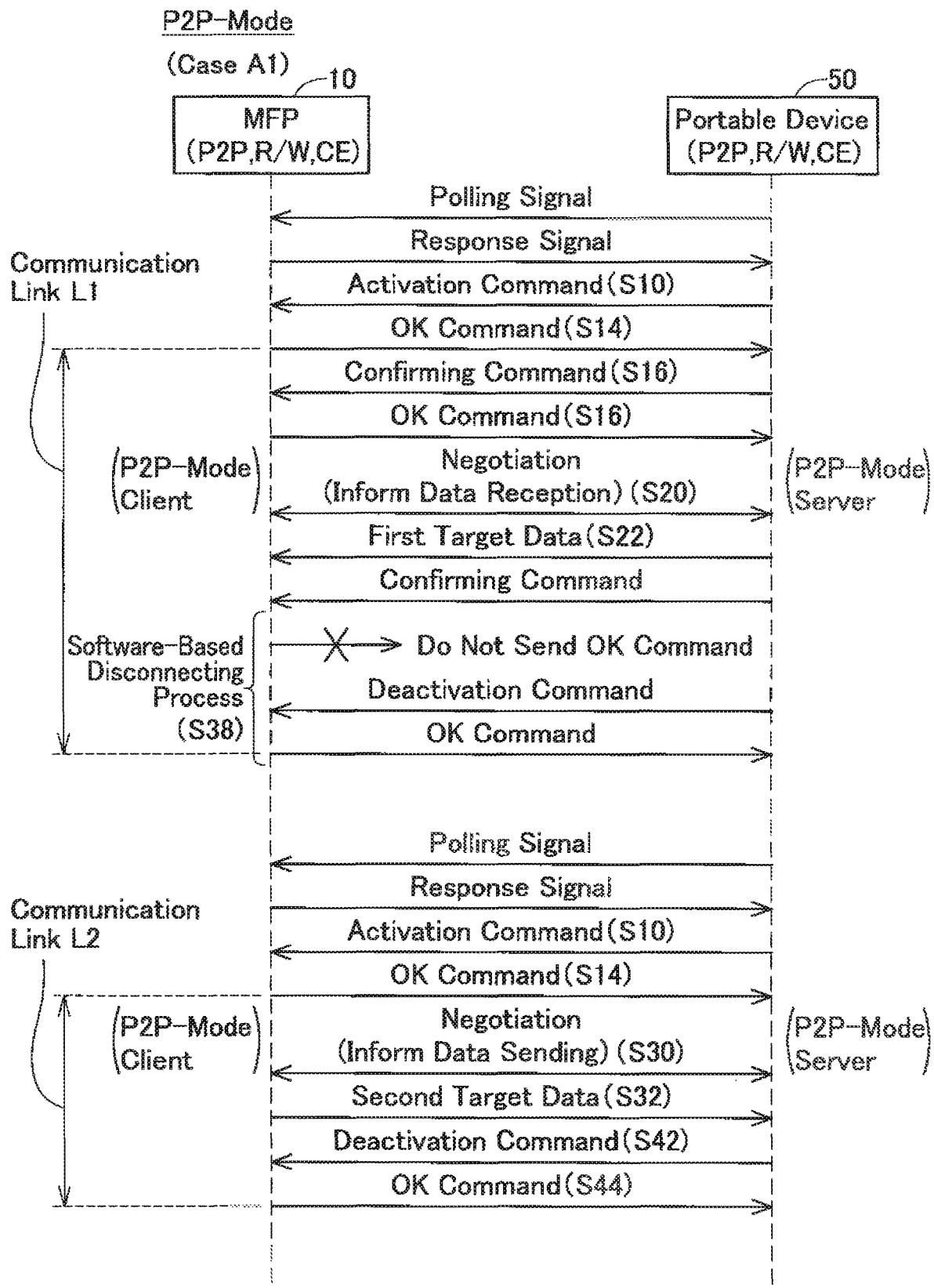
FIG. 6 shows a sequence chart of a case A1, which is an example of communication in a P2P-mode.

(Case A1; FIG. 6)

In the case A1, the MFP 10 executes the Listen-operation (i.e., the portable device 50 executes the Poll-operation) and the portable device 50 can be operated according to the P2P-mode.

The MFP 10 receives the activation command from the portable device 50 (S10 of FIG. 2) and sends an OK command to portable device 50 (S14). Consequently, a communication link L1 is established between the MFP 10 and the portable device 50. In this case, the MFP 10 starts the confirming command responding process (S16). In other words, the MFP 10 receives the confirming command from the portable device 50 and sends an OK command to the portable device 50.

In the case A1, the sending flag is set at "0" at the time of the establishment of the communication link L1. In this case, the MFP 10 determines that the result of S18 of FIG. 2 is NO, executes the negotiation subsequently, and then informs the portable device 50 of that the MFP 10 executes data reception (S20). The MFP 10 receives the first target data from the portable device 50 (S22) and generates the second target data by processing the first target data (S24). In this case, the MFP 10 sets the sending flag at "1" and the communication complete flag at "1" (S28).

Next, the MFP 10 executes the software-based disconnecting process (S38). In other words, the MFP 10 does not send an OK command even when receiving the confirming command from the portable device 50. In this case, the MFP 10 receives the deactivation command from the portable device 50 and sends an OK command to the portable device 50. As a result, the communication link L1 is disconnected.

Thereafter, the MFP 10 executes the Listen-operation again (i.e., the portable device 50 executes the Poll-operation again). The MFP 10 receives the activation command from the portable device 50 (S10) and sends an OK command to the portable device 50 (S14). As a result, a communication link L2 is established between the MFP 10 and the portable device 50.

The sending flag is set at "1" when the first target data is communicated. In this case, the MFP 10 determines that the result of S18 of FIG. 2 is YES, executes the negotiation subsequently, and then informs the portable device 50 of that the MFP 10 executes data sending (S30). The MFP 10 sends the second target data to the portable device 50 (S32). In this case, the MFP 10 sets the sending flag at "0" and the communication complete flag at "0" (S40). The MFP 10 then receives the deactivation command from the portable device 50 (S42) and sends an OK command to the portable device 50 (S44). As a result, the communication link L2 is disconnected.

As described above, the P2P-mode is a mode for bidirectional communication. Therefore, considered is a configuration in which both the first and second target data are communicated using the same communication link L1. However, there is a possibility that the portable device 50 cannot appropriately execute bidirectional communication in accordance with the P2P-mode. For example, there is a possibility that an OS (Operating System) of the portable device 50 does not allow the operation of receiving the second target data using the same communication link L1 to be performed after sending the first target data by using the communication link L1.

In view of these possibilities, in the present embodiment, the MFP 10 disconnects the communication link L1 when receiving the first target data from the portable device 50 by using the communication link L1 corresponding to the P2P, as shown in the case A1. Subsequently, the MFP 10 reestablishes the communication link L2 corresponding to P2P and sends the second target data to the portable device 50 by using the communication link L2. Thus, even when the portable device 50 does not allow the execution of bidirectional communication according to the P2P-mode, the MFP 10 can appropriately communicate the first target data and the second target data with the portable device 50 in accordance with the P2P-mode, the second target data being generated by processing the first target data.

Figure 7:
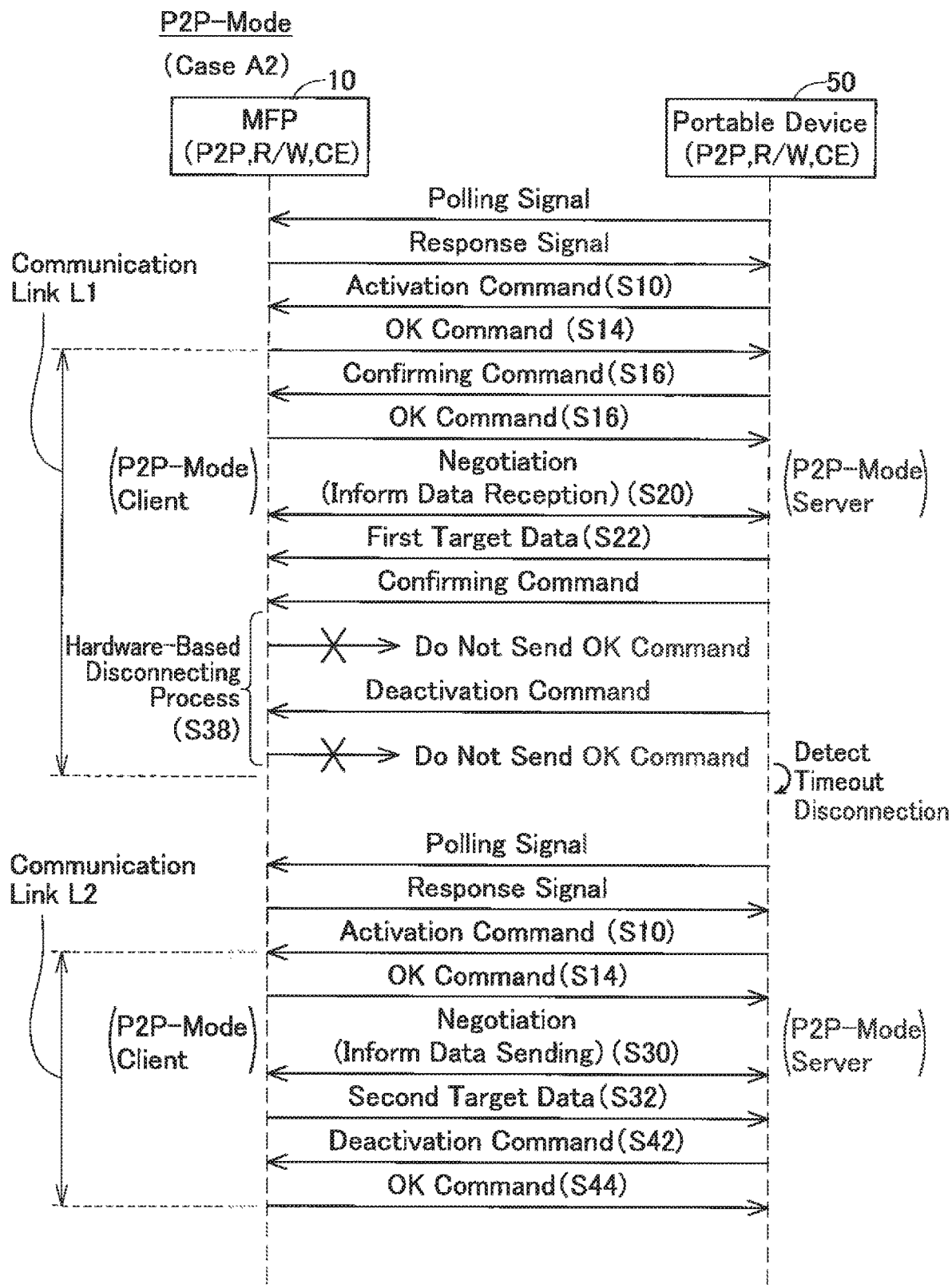
FIG. 7 shows a sequence chart of a case A2, which is an example of communication in a P2P-mode.

(Case A2; FIG. 7)

A case A2 is different from the case A1 in that the MFP 10 executes the hardware-based disconnecting process (S38 of FIG. 2) in place of the software-based disconnecting process.

In other words, the MFP 10 temporarily stops the operations of the NFC I/F 22 in the hardware-based disconnecting process. The MFP 10, therefore, does not send an OK command even when receiving the confirming command from the portable device 50. The MFP 10 also does not send an OK command even when receiving the deactivation command from the portable device 50. Consequently, the portable device 50 determines this situation as a timeout, resulting in disconnecting the communication link L1. The other points of the case A2 are same as those of the case A1. The same operations and effects as those of the case A1 can be obtained with the case A2 as well.

Note that the execution of the hardware-based disconnecting process for the case A2 might require a long time for the NFC I/F 22 to recover. Therefore, from the aspect of expediting the process, it is preferred that the software-based disconnecting process for the case A1 be executed. However, the hardware-based disconnecting process for the case A2 can reliably disconnect the communication link L1. Thus, from the aspect of accomplishing reliable disconnection of the communication link, it is preferred that the hardware-based disconnecting process for the case A2 be executed. With regard to the other cases as well (such as a case A4 shown in FIG. 4), either the software-based disconnecting process or the hardware-based disconnecting process may be adopted depending on the aspect valued by the vendor or manufacturer of the MFP 10.

Figure 8:
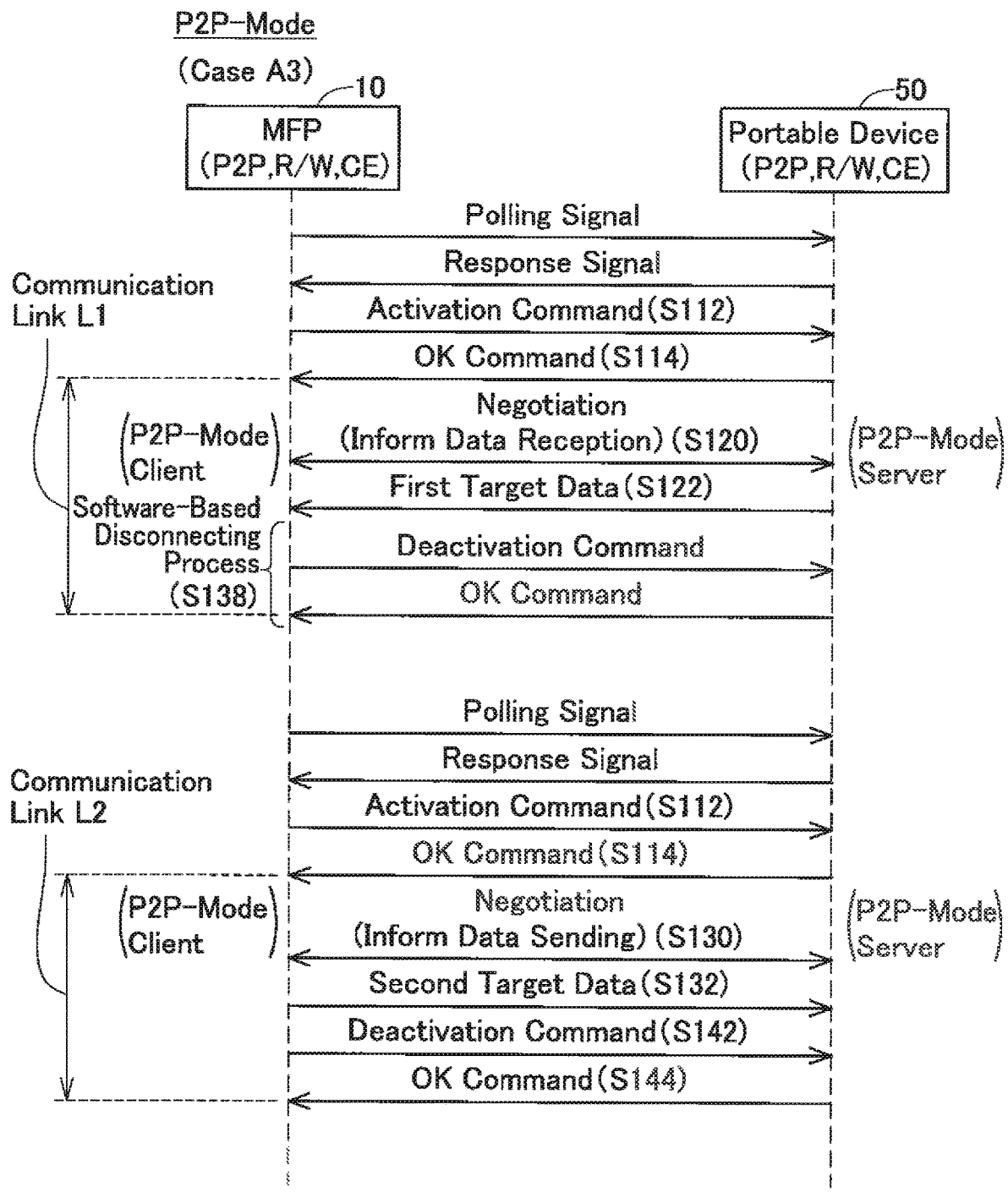
FIG. 8 shows a sequence chart of a case A3, which is an example of communication in a P2P-mode.

(Case A3; FIG. 8)

In the case A3, the MFP 10 executes the Poll-operation (i.e., the portable device 50 executes the Listen-operation) and the portable device 50 can be operated according to the P2P-mode.

The MFP 10 sends the activation command to the portable device 50 (S112 of FIG. 4) and receives an OK command from the portable device 50 (S114). Consequently, a communication link L1 is established between the MFP 10 and the portable device 50.

In the case A3, the sending flag is set at "0" at the time of the establishment of the communication link L1. In this case, the MFP 10 determines that the result of S118 of FIG. 4 is NO, executes the negotiation subsequently, and then informs the portable device 50 of that the MFP 10 executes data reception (S120). The MFP 10 receives the first target data from the portable device 50 (S122) and generates the second target data by processing the first target data (S124). In this case, the MFP 10 sets the sending flag at "1" and the communication complete flag at "1" (S128).

Next, the MFP 10 executes the software-based disconnecting process (S138). In other words, the MFP 10 sends a deactivation command to the portable device 50 and receives an OK command from the portable device 50. As a result, the communication link L1 is disconnected.

Thereafter, the MFP 10 executes the Poll-operation again (i.e., the portable device 50 executes the Listen-operation again). The MFP 10 sends the activation command to the portable device 50 (S112) and receives an OK command from the portable device 50 (S114). As a result, a communication link L2 is established between the MFP 10 and the portable device 50.

The sending flag is set at "1" when the first target data is communicated. In this case, the MFP 10 determines that the result of S118 of FIG. 4 is YES, executes the negotiation subsequently, and then informs the portable device 50 of that the MFP 10 executes data sending (S130). The MFP 10 sends the second target data to the portable device 50 (S132). In this case, the MFP 10 sets the sending flag at "0" and the communication complete flag at "0" (S140). The MFP 10 then sends the deactivation command to the portable device 50 (S142) and receives an OK command from the portable device 50 (S144). As a result, the communication link L2 is disconnected.

As well as with the case A3, the MFP 10 can appropriately communicate the first target data and the second target data with the portable device 50 in accordance with the P2P-mode, the second target data being generated by processing the first target data.

Figure 9:
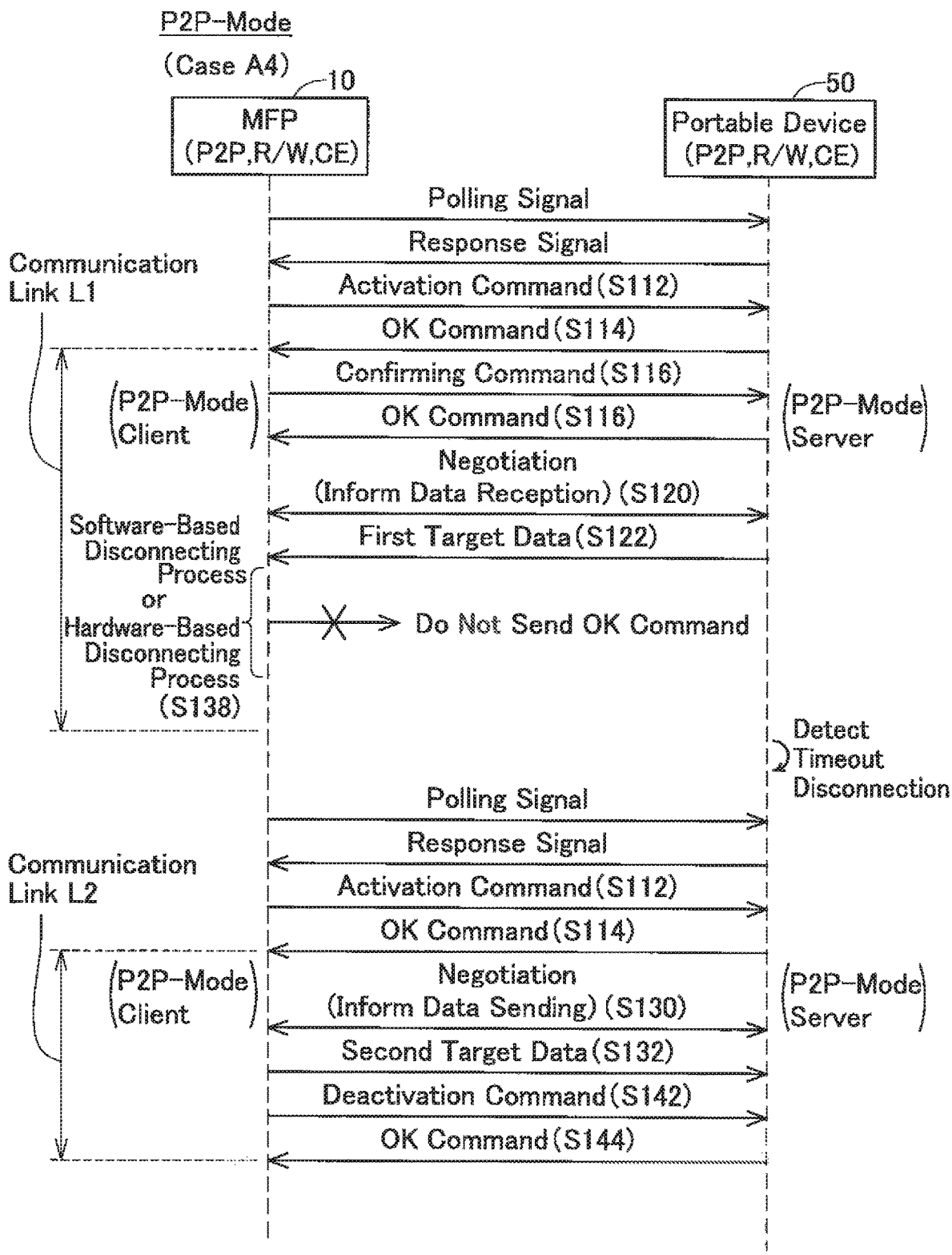
FIG. 9 shows a sequence chart of a case A4, which is an example of communication in a P2P-mode.

(Case A4; FIG. 9)

A case A4 is different from the case A3 in terms of the contents of the software-based disconnecting process. Note that, once the communication link L1 is established, the MFP 10 starts the confirming command sending process (S116). In other words, the MFP 10 sends the confirming command to the portable device 50 and receives an OK command from the portable device 50.

In the software-based disconnecting process for the case A3, the MFP 10 sends the deactivation command to the portable device 50 and receives an OK command from the portable device 50 (see FIG. 8). In the software-based disconnecting process for the case A4, on the other hand, the MFP 10 ends the confirming command sending process (S138). Accordingly, the portable device 50 determines this situation as a timeout, resulting in disconnecting the communication link L1. The other points are same as those of the case A3. The same operations and effects as those of the case A3 can be obtained with the case A4 as well.

As described above, the MFP 10 may execute the hardware-based disconnecting process for temporarily stopping the operations of the NFC I/F 22 (S138). In this case as well, because the confirming command is not sent to the portable device 50, the portable device 50 determines the situation as a timeout, resulting in disconnecting the communication link L1. This configuration can achieve the same operations and effects.

(Other Cases)

In the cases A1 to A4 shown in FIGS. 6 to 9, when establishing the first communication link L1 and when establishing the second communication link L2, the MFP 10 is operated as the same device (i.e., as the Listen device in FIGS. 6 and 7, and as the Poll device in FIGS. 8 and 9). However, for example, when establishing the first communication link L1 the MFP 10 may be operated as the Listen device, and when establishing the second communication link L2 the MFP 10 may be operated as the Poll device. Furthermore, for example, when establishing the first communication link L1 the MFP 10 may be operated as the Poll device, and when establishing the second communication link L2 the MFP 10 may be operated as the Listen device.

Moreover, in the cases A1 to A4 shown in FIGS. 6 to 9, the MFP 10 receives the first target data from the portable device 50 and sends the second target data to the portable device 50. In other words, the cases A1 to A4 correspond to the first to fifth examples relating to the target data. However, the MFP 10 may send the first target data to the portable device 50 and receive the second target data from the portable device 50. In other words, the sixth example relating to the target data may be realized. In any of the cases the same operations and effects as those of the cases A1 to A4 can be obtained.

Figure 10:
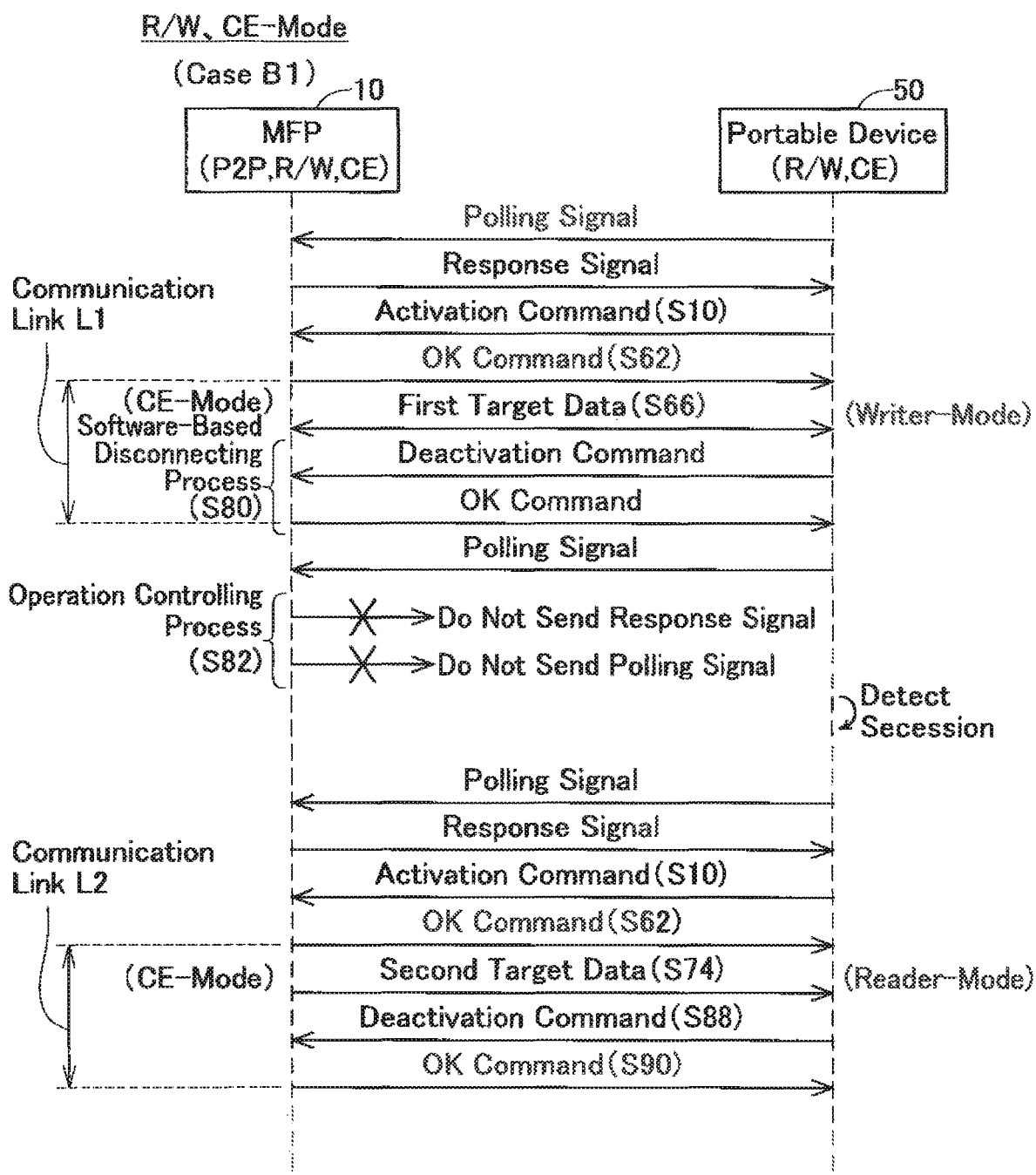
FIG. 10 shows a sequence chart of a case B1, which is an example of communication in a R/W-mode and communication in a CE-mode.

(Case B1; FIG. 10)

In the case B1, the MFP 10 executes the Listen-operation (i.e., the portable device 50 executes the Poll-operation) and the portable device 50 can be operated according to only the R/W mode and the CE-mode. Therefore, the MFP 10 is operated according to the CE-mode, and the portable device 50 is operated according to the R/W-mode.

The MFP 10 receives the activation command from the portable device 50 (S10 of FIG. 2) and sends an OK command to portable device 50 (S62). Consequently, a communication link L1 is established between the MFP 10 and the portable device 50.

In the case B1, the sending flag is set at "0" at the time of the establishment of the communication link L1. In this case, the MFP 10 determines that the result of S64 of FIG. 3 is NO, receives the first target data from the portable device 50 (S66) and generates the second target data by processing the first target data (S68). In this case, the MFP 10 sets the sending flag at "1" and the communication complete flag at "1" (S72).

Next, the MFP 10 executes the software-based disconnecting process (S80). In other words, the MFP 10 receives the deactivation command from the portable device 50 and sends an OK command to the portable device 50. As a result, the communication link L1 is disconnected.

Next, the MFP 10 executes the operation controlling process (S82). In other words, the MFP 10 does not send a response signal even when receiving a polling signal from the portable device 50 (i.e., the NFC I/F 22 does not execute the Listen-operation temporarily). The MFP 10 does not send a polling signal to the portable device 50 (i.e., the NFC I/F 22 does not execute the Poll-operation temporarily). Consequently, the portable device 50 detects secession of the MFP 10. As a result, even when the MFP 10 and the portable device 50 remain close to each other, the communication link L2 described hereinafter can appropriately be established.

Thereafter, the MFP 10 executes the Listen-operation again (i.e., the portable device 50 executes the Poll-operation again). The MFP 10 receives the activation command from the portable device 50 (S10 in FIG. 2) and sends an OK command to the portable device 50 (S62). As a result, a communication link L2 is established between the MFP 10 and the portable device 50.

The sending flag is set at "1" when the first target data is communicated. In this case, the MFP 10 determines that the result of S64 of FIG. 3 is YES and sends the second target data to the portable device 50 (S74). In this case, the MFP 10 sets the sending flag at "0" and the communication complete flag at "0" (S86). The MFP 10 then receives the deactivation command from the portable device 50 (S88) and sends an OK command to the portable device 50 (S90). As a result, the communication link L2 is disconnected.

As described above, the R/W-mode and the CE-mode are the modes for unidirectional communication. Thus, both the first and second target data cannot be communicated using the same communication link L1. In the present embodiment, when the MFP 10 receives the first target data from the portable device 50 by using the communication link L1, as shown in the case B1, the communication link L1 is disconnected. Next, the MFP 10 reestablishes the communication link L2 and sends the second target data to the portable device 50 by using the communication link L2. Therefore, even when the MFP 10 and the portable device 50 are operated according to the R/W-mode and the CE-mode, the MFP 10 can appropriately communicate the first target data and the second target data with the portable device 50, the second target data being generated by processing the first target data. In other words, the MFP 10 can realize pseudo bidirectional communication.

Figure 11:
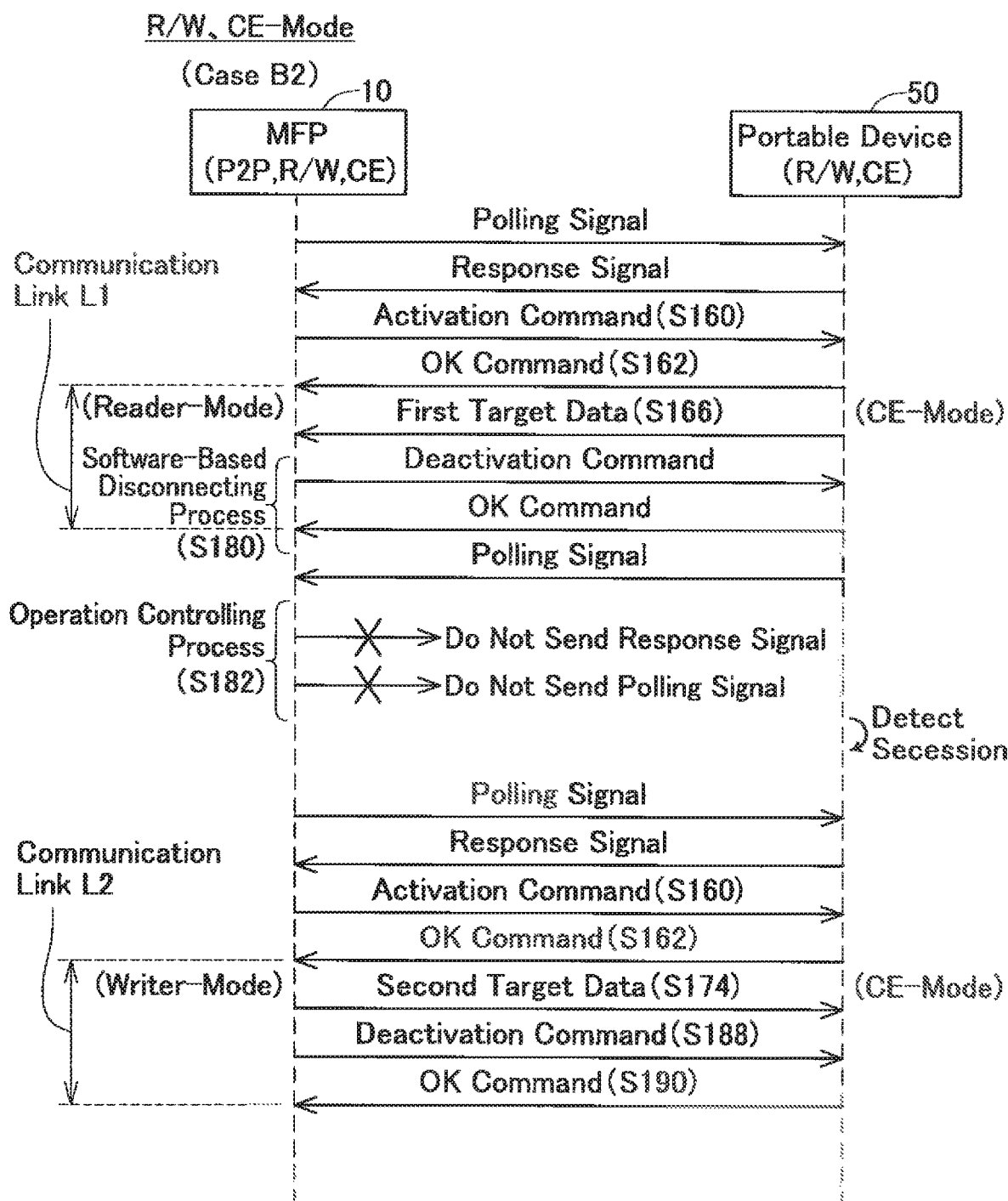
FIG. 11 shows a sequence chart of a case B2, which is an example of communication in a R/W-mode and communication in a CE-mode.

(Case B2; FIG. 11)

In the case B1, the MFP 10 executes the Poll-operation (i.e., the portable device 50 executes the Listen-operation) and the portable device 50 can be operated according to only the R/W mode and the CE-mode. Therefore, the MFP 10 is operated according to the R/W-mode and the portable device 50 is operated according to the CE-mode.

The MFP 10 sends the activation command to the portable device 50 (S160 of FIG. 5) and receives an OK command from portable device 50 (S162). Consequently, a communication link L1 is established between the MFP 10 and the portable device 50.

In the case B2, the sending flag is set at "0" at the time of the establishment of the communication link L1. In this case, the MFP 10 determines that the result of S164 of FIG. 5 is NO and determines that the MFP 10 is to be operated according to the Reader-mode (S165). The MFP 10 receives the first target data from the portable device 50 (S166) and generates the second target data by processing the first target data (S168). In this case, the MFP 10 sets the sending flag at "1" and the communication complete flag at "1" (S172).

Next, the MFP 10 executes the software-based disconnecting process (S180). In other words, the MFP 10 sends the deactivation command to the portable device 50 and receives an OK command from the portable device 50. As a result, the communication link L1 is disconnected.

Next, the MFP 10 executes the operation controlling process (S182). Consequently, the portable device 50 detects a secession of the MFP 10. Thereafter, the MFP 10 executes the Poll-operation again (i.e., the portable device 50 executes the Listen-operation again). The MFP 10 sends the activation command to the portable device 50 (S160) and receives an OK command from the portable device 50 (S162). As a result, a communication link L2 is established between the MFP 10 and the portable device 50.

The sending flag is set at "1" when the first target data is communicated. In this case, the MFP 10 determines that the result of S164 of FIG. 5 is YES and determines that the MFP 10 is to be operated according to the Writer-mode (S173). The MFP 10 sends the second target data to the portable device 50 (S174). In this case, the MFP 10 sets the sending flag at "0" and the communication complete flag at "0" (S186). The MFP 10 then sends the deactivation command to the portable device 50 (S188) and receives an OK command from the portable device 50 (S190). As a result, the communication link L2 is disconnected.

The same operations and effects as those of the case B1 can be obtained with the case B2 as well. In other words, even when the MFP 10 and the portable device 50 are operated according to the R/W-mode and the CE-mode, the MFP 10 can realize pseudo bidirectional communication.

(Other Cases)

Figure 12:
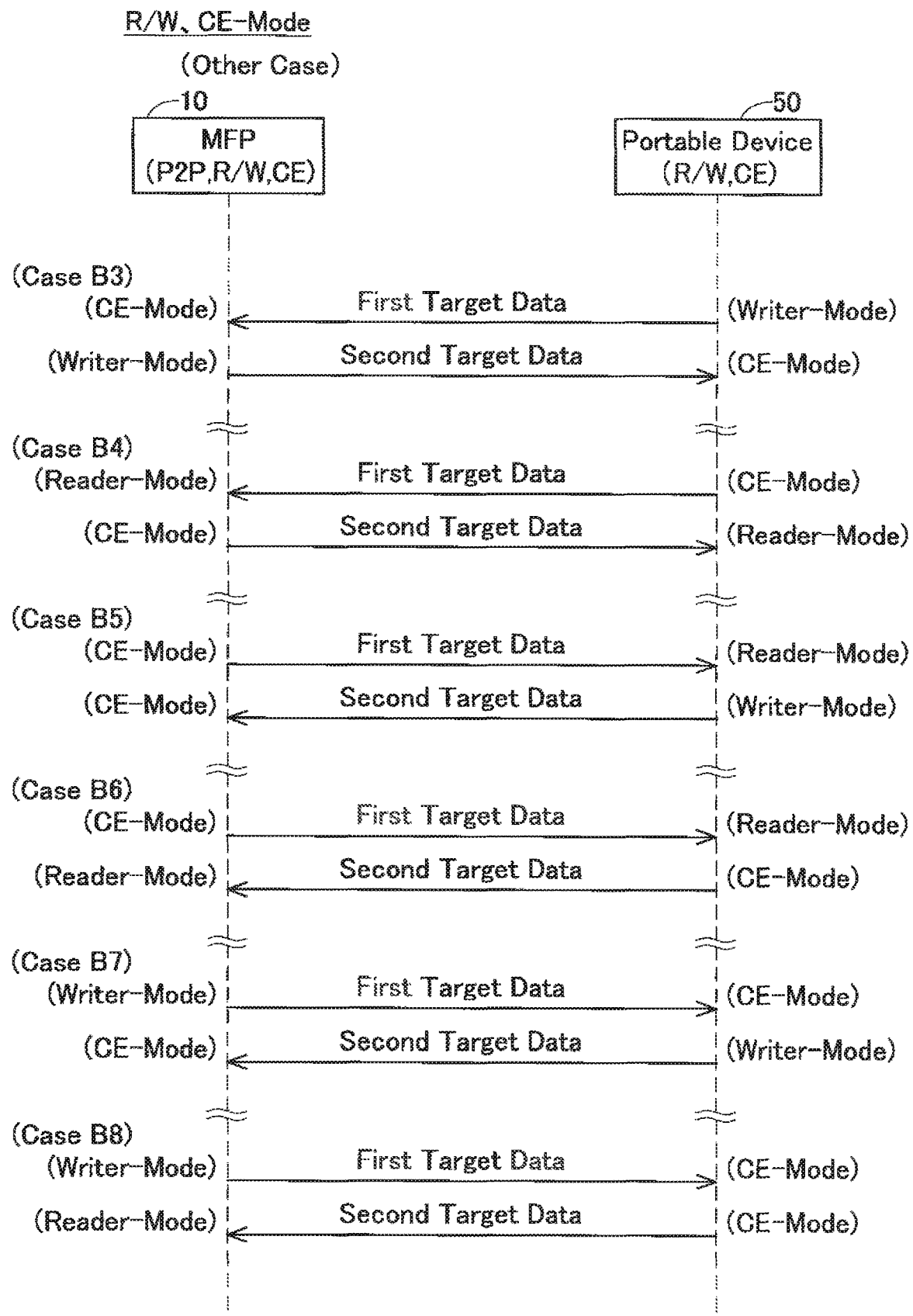
FIG. 12 shows a sequence chart of cases B3 to B8, which is an example of communication in a R/W-mode and communication in a CE-mode.

In the cases B1 and B2 shown in FIGS. 10 and 11, when establishing the first communication link L1 and when establishing the second communication link L2, the MFP 10 is operated as the same device (i.e., the Listen device in FIG. 10, the Poll device in FIG. 11). However, for example, as shown in the case B3 of FIG. 12, when establishing the first communication link L1 the MFP 10 may be operated as the Listen device (i.e., CE-Mode), and when establishing the second communication link L2 the MFP 10 may be operated as the Poll device (i.e., Writer-Mode). Furthermore, for example, as shown in the case B4 of FIG. 12, when establishing the first communication link L1 the MFP 10 may be operated as the Poll device (i.e., Reader-Mode), and when establishing the second communication link L2 the MFP 10 may be operated as the Listen device (i.e., CE-Mode).

Moreover, in the cases B1 and B2 shown in FIGS. 10 and 11, the MFP 10 receives the first target data from the portable device 50 and sends the second target data to the portable device 50. In other words, the cases B1 and B2 correspond to the first to fifth examples relating to the target data. However, as shown in the cases B5 to B8 of FIG. 12, the MFP 10 may send the first target data to the portable device 50 and receive the second target data from the portable device 50. In other words, the sixth example relating to the target data may be realized. In any of the cases the same operations and effects as those of the cases B1 and B2 can be obtained.

(Corresponding Relationship)

The MFP 10 is an example of "a communication device". The portable device 50 is an example of "an external device". The activation command is an example of "a first establishing command" and "a second establishing command" The deactivation command is an example of "a disconnecting command" The sending flag=1 is an example of "sending information". In the cases A1 to A4 of FIGS. 6 to 9, the P2P-mode is an example of "a sending-mode" and "a receiving-mode". In the case B1 of FIG. 10, the CE-mode is an example of "a sending-mode" and "a receiving-mode". In the case B2 of FIG. 11, the Writer-mode is an example of "a sending-mode. In the case B2 of FIG. 11, the Reader-mode is an example of "a receiving-mode.

S10 and S14 of FIG. 2, S62 of FIGS. 3, S112 and S114 of FIG. 4, and S160 and S162 of FIG. 5 are examples of "a first establishing step (and a first establishing module)" and "a second establishing step (and a second establishing module)". S22 and S32 of FIGS. 2, S66 and S74 of FIGS. 3, S122 and S132 of FIG. 4, and S166 and S174 of FIG. 5 are examples of "a first communicating step (and a first communicating module)" and "a second communicating step (and a second communicating module)". S38 of FIG. 2, S80 of FIG. 3, S138 of FIG. 4, and S180 of FIG. 5 are examples of "a disconnecting step (and a disconnecting module)". S38 of FIG. 2 is an example of "a first disconnecting method". S138 of FIG. 4 is an example of "a second disconnecting method". S80 of FIG. 3 is an example of "a first disconnecting method". S180 of FIG. 5 is an example of "a second disconnecting method".

A confirming command responding process started at S16 of FIG. 2 is an example of "a first confirming step". A confirming command sending process started at S116 of FIG. 4 is an example of "a second confirming step". S82 of FIG. 3 and S182 of FIG. 5 are examples of "an operation controlling step". S18 of FIG. 2, S64 of FIG. 3, S118 of FIG. 4 and S164 of FIG. 5 are examples of "a determining step". S28 and S36 of FIGS. 2, S72 and S78 of FIGS. 3, S128 and S136 of FIG. 4 and S172 and S178 of FIG. 5 are examples of "a memory controlling step". S20 of FIG. 2 and S120 of FIG. 4 are examples of "an informing step". S165 and S173 of FIG. 5 are examples of "a deciding step". S24 of FIG. 2, S68 of FIG. 3, S124 of FIG. 4 and S168 of FIG. 5 are examples of "a processing step". S22 of FIG. 2, S66 of FIG. 3, S122 of FIG. 4 and S166 of FIG. 5 are examples of "a receiving step". S32 of FIG. 2, S74 of FIG. 3, S132 of FIG. 4 and S174 of FIG. 5 are examples of "a sending step".

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

(Modification 1)

The "communication device" is not limited to the multifunction peripheral (i.e., the MFP 10) capable of executing the printing function and the scanning function, and, therefore, may be a printer capable of executing only the printing function out of the printing function and the scanning function or may be a scanner capable of executing only the scanning function out of the printing function and the scanning function. The "communication device" may be a device that executes a function different from the printing function and the scanning function (e.g., an image display function, a data calculation function) (e.g., a PC, server, portable terminal (cellular phone, smartphone, PDA, etc.)). In other words, the "communication device" includes various devices capable of executing the NFC scheme communications.

(Modification 2)

The MFP 10 may not be able to use the P2P-mode and may be capable of using only the R/W-mode and the CE-mode. In this case, the CPU 32 may execute each of the processes shown in FIGS. 3 and 5 without executing the processes shown in FIGS. 2 and 4. Furthermore, the MFP 10 may not be able to use the R/W-mode and the CE-mode and may be capable of using only the P2P-mode. In other words, the "communication device" may not be able to use all of the modes complying with the NFC standard and may be capable of using at least one of the modes.

(Modification 3)

In each of the embodiments described above, each of the processes shown in FIGS. 2 to 5 is realized by the software (i.e., the programs 36, 38), but at least one of the processes shown in FIGS. 2 to 5 may be realized by hardware such as a logic circuit.

(Modification 4)

In the foregoing embodiment, a print executing unit 18 and a scan executing unit 20 are realized as a result of the controller 30 executing the processes according to the program in a memory 34. Nevertheless, at least one unit of respective units 18 and 20 may alternately be realized by a hardware resource such as a logic circuit.

What is claimed is:

1. A non-transitory computer-readable recording medium storing computer-readable instructions for a communication device,
wherein the computer-readable instructions, when executed by a processor of the communication device, cause the communication device to function to:
communicate a first establishing command with an external device via a communication interface of the communication device, the first establishing command being for establishing a first communication link between the communication device and the external device according to a first communication scheme;
after the first establishing command has been communicated, establish the first communication link;
after the first communication link has been established, read communication setting information from a memory of the external device via the communication interface by using the first communication link, the communication setting information being for executing communication with the external device according to a second communication scheme that is different from the first communication scheme, and a communication speed according to the first communication scheme being slower than a communication speed according to the second communication scheme; and
after the communication setting information has been read from the memory of the external device, write, in the memory of the external device via the communication interface, a response indicating that the communication setting information has been read from the memory of the external device.

2. The non-transitory computer-readable recording medium as in claim 1, wherein
the first communication scheme is a Near Field Communication (NFC) scheme.

3. The non-transitory computer-readable recording medium as in claim 1, wherein
the computer-readable instructions, when executed by the processor of the communication device, cause the communication device to further function to:
disconnect the first communication link after the communication setting information has been read from the external device;
after the first communication link has been disconnected, communicate a second establishing command with the external device via the communication interface, the second establishing command being for establishing a second communication link between the communication device and the external device according to the first communication scheme; and
after the second establishing command has been communicated, establish the second communication link,
wherein the response is written in the memory of the external device via the communication interface by using the second communication link after the second communication link has been established.

* * * * *